(12) United States Patent
Ueno et al.

(10) Patent No.: US 9,501,204 B2
(45) Date of Patent: *Nov. 22, 2016

(54) DISPLAY DEVICE

(71) Applicant: KYOCERA CORPORATION, Kyoto (JP)

(72) Inventors: Yasuhiro Ueno, Yokohama (JP); Shigeki Tanabe, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/001,191

(22) Filed: Jan. 19, 2016

(65) Prior Publication Data

US 2016/0132212 A1 May 12, 2016

Related U.S. Application Data

(63) Continuation of application No. 13/532,885, filed on Jun. 26, 2012, now Pat. No. 9,275,608.

(30) Foreign Application Priority Data

Jun. 28, 2011 (JP) ................................ 2011-143070

(51) Int. Cl.
*G06F 3/0481* (2013.01)
*G06F 3/0484* (2013.01)
(Continued)

(52) U.S. Cl.
CPC ......... *G06F 3/04815* (2013.01); *G06F 1/1686* (2013.01); *G06F 3/011* (2013.01); *G06F 3/017* (2013.01); *G06F 3/0304* (2013.01); *G06F 3/0325* (2013.01); *G06F 3/044* (2013.01); *G06F 3/0416* (2013.01); *G06F 3/04845* (2013.01); *G09G 5/08* (2013.01); *H04N 13/00* (2013.01);
(Continued)

(58) Field of Classification Search
CPC ............. G06F 3/04815; G06F 3/0416; G06F 3/04845; G06F 3/0304; G06F 3/044; G06F 3/011; G06F 3/017; G06F 1/1686; G06F 3/0325; G06F 2203/04101; H04N 13/0275; H04N 13/0497; H04N 13/00; G09G 5/08
See application file for complete search history.

(56) References Cited

U.S. PATENT DOCUMENTS 5,381,158 A 1/1995 Takahara et al.
5,565,888 A 10/1996 Selker
(Continued)

FOREIGN PATENT DOCUMENTS

JP 58-89287 A 5/1983
JP 5-189484 A 7/1993
(Continued)

OTHER PUBLICATIONS

Office Action mailed Oct. 28, 2014, corresponding to Japanese patent application No. 2011-143070.
(Continued)

*Primary Examiner* — Aneeta Yodichkas
(74) *Attorney, Agent, or Firm* — Hauptman Ham, LLP

(57) ABSTRACT

According to an aspect, a display device includes a display unit and a control unit. The display unit stereoscopically displays a display object. When a movement of an object is detected in a three-dimensional space where the display object is stereoscopically displayed, the control unit for changes the display object in the three-dimensional space according to the movement of the object.

10 Claims, 18 Drawing Sheets

(51) Int. Cl.

| | | |
|---|---|---|
| G06F 1/16 | (2006.01) | |
| G06F 3/01 | (2006.01) | |
| G06F 3/03 | (2006.01) | |
| G06F 3/044 | (2006.01) | |
| G06F 3/041 | (2006.01) | |
| G09G 5/08 | (2006.01) | |
| H04N 13/00 | (2006.01) | |
| H04N 13/04 | (2006.01) | |
| H04N 13/02 | (2006.01) | |

(52) U.S. Cl.
CPC ...... *H04N 13/0275* (2013.01); *H04N 13/0497* (2013.01); *G06F 2203/04101* (2013.01)

(56) References Cited

U.S. PATENT DOCUMENTS

| | | | |
|---|---|---|---|
| 5,736,974 | A | 4/1998 | Selker |
| 6,191,773 | B1 | 2/2001 | Maruno et al. |
| 6,222,465 | B1 | 4/2001 | Kumar et al. |
| 6,243,054 | B1* | 6/2001 | DeLuca ............... G02B 27/22 345/419 |
| 6,624,833 | B1 | 9/2003 | Kumar et al. |
| 6,816,176 | B2 | 11/2004 | Laffey et al. |
| 6,992,666 | B2 | 1/2006 | Hiraki et al. |
| 7,023,436 | B2 | 4/2006 | Segawa et al. |
| 7,227,526 | B2 | 6/2007 | Hildreth et al. |
| 7,348,963 | B2 | 3/2008 | Bell |
| 7,434,177 | B1 | 10/2008 | Ording et al. |
| 7,519,223 | B2 | 4/2009 | Dehlin et al. |
| 7,598,942 | B2 | 10/2009 | Underkoffler et al. |
| 7,701,439 | B2 | 4/2010 | Hillis et al. |
| 7,862,415 | B1 | 1/2011 | Ghaly |
| 8,072,470 | B2 | 12/2011 | Marks |
| 8,166,421 | B2 | 4/2012 | Magal et al. |
| 8,451,268 | B1 | 5/2013 | Reisman et al. |
| 8,531,396 | B2 | 9/2013 | Underkoffler et al. |
| 8,559,676 | B2 | 10/2013 | Hildreth |
| 8,881,051 | B2 | 11/2014 | Frey et al. |
| 8,897,491 | B2 | 11/2014 | Ambrus et al. |
| 9,275,608 | B2* | 3/2016 | Ueno ............... H04N 13/0497 |
| 2003/0007015 | A1 | 1/2003 | Laffey et al. |
| 2006/0098873 | A1 | 5/2006 | Hildreth et al. |
| 2006/0161870 | A1 | 7/2006 | Hotelling et al. |
| 2007/0132721 | A1* | 6/2007 | Glomski ............... G06F 3/011 345/156 |
| 2007/0152958 | A1 | 7/2007 | Ahn et al. |
| 2008/0168403 | A1 | 7/2008 | Westerman et al. |
| 2008/0212836 | A1 | 9/2008 | Fujimura et al. |
| 2009/0077504 | A1 | 3/2009 | Bell et al. |
| 2010/0095206 | A1 | 4/2010 | Kim |
| 2010/0134411 | A1* | 6/2010 | Tsumura ............... G06F 3/0304 345/156 |
| 2010/0199221 | A1 | 8/2010 | Yeung et al. |
| 2010/0280988 | A1 | 11/2010 | Underkoffler et al. |
| 2010/0281440 | A1 | 11/2010 | Underkoffler et al. |
| 2010/0315413 | A1* | 12/2010 | Izadi ............... G06F 3/017 345/419 |
| 2010/0328438 | A1 | 12/2010 | Ohyama et al. |
| 2011/0022982 | A1 | 1/2011 | Takaoka et al. |
| 2011/0109577 | A1* | 5/2011 | Lee ............... G06F 3/044 345/173 |
| 2011/0148918 | A1* | 6/2011 | Ishizawa ............... G06T 11/60 345/629 |
| 2011/0164032 | A1 | 7/2011 | Shadmi |
| 2011/0191707 | A1* | 8/2011 | Lee ............... G06F 3/011 715/765 |
| 2011/0193939 | A1 | 8/2011 | Vassigh et al. |
| 2011/0310100 | A1 | 12/2011 | Adimatyam et al. |
| 2012/0032917 | A1 | 2/2012 | Yamaguchi |
| 2012/0117514 | A1 | 5/2012 | Kim et al. |
| 2012/0268410 | A1* | 10/2012 | King ............... G06F 3/04883 345/173 |
| 2012/0306856 | A1* | 12/2012 | Tada ............... H04N 13/0022 345/419 |

FOREIGN PATENT DOCUMENTS

| | | |
|---|---|---|
| JP | 10-99543 A | 4/1998 |
| JP | 11-250283 A | 9/1999 |
| JP | 2000-184398 A | 6/2000 |
| JP | 2002-123840 A | 4/2002 |
| JP | 2003-24631 A | 1/2003 |
| JP | 2005-316790 A | 11/2005 |
| JP | 2007-86931 A | 4/2007 |
| JP | 2010-55507 A | 3/2010 |
| JP | 2011-13778 A | 1/2011 |
| JP | 2011-28534 A | 2/2011 |
| JP | 2011-95547 A | 5/2011 |
| JP | 2011-96171 A | 5/2011 |
| JP | 2011-101677 A | 5/2011 |
| JP | 2012-115414 A | 6/2012 |
| WO | 2009/127701 A1 | 10/2009 |

OTHER PUBLICATIONS

Office Action mailed Apr. 21, 2015, corresponding to Japanese patent application No. 2011-143070.

Office Action mailed Sep. 9, 2014, corresponding to Japanese Patent Application No. 2011-119688.

Wan Huagen; Gao Shuming; Peng Qunsheng, "Virtual Grasping for Virtual Assembly Tasks" Proceedings of the Third International Conference on Image and Graphics, IEEE Computer Society, 2004.

Jota Ricardo et al., "The Continuous Interaction Space: Interaction Techniques Unifying Touch and Gesture on and above a Digital Surface", Gesture, (2011).

Jakub Segen et al., "Shadow Gestures: 3D Hand Pose Estimation using a Single Camera". 2013 IEEE Conference on Computer Vision and Pattern Recognition. vol. 1, IEEE Computer Society, 1999.

Tzafestas, C.S. "Whole-hand kinesthetic feedback and haptic perception in dextrous virtual manipulation." IEEE Transactions on Systems, Man, and Cybernetics, Part A: Systems and Humans, vol. 33, No. 1, Jan. 2003; pp. 100-113.

Thomas Ullmann et al., "Intuitive Virtual Grasping for Non Haptic Environments" Proceedings of the 8th Pacific conference on Computer Graphic and Applications, Oct. 3-5, pp. 373-457, 2000 IEEE.

Ji Zhao et al., "MobileSurface: Interaction in the Air for Mobile Computing" Adjunct proceedings of the 23th annual ACM symposium on User interface software and technology, ACM Oct. 2010, pp. 459-460.

Christoph W. Borst et al., "Realistic virtual grasping" Proceedings of the 2005 IEEE Conference 2005 on Virtual Reality, pp. 91-98 and 320, Mar. 12-16, 2005.

Volkert Buchmann et al., "FingARtips—Gesture Based Direct Manipulation in Augmented Reality" Proceedings of the 2nd international conference on Computer graphics and interactive techniques in Australasia and South East Asia, ACM 2004 pp. 212-221.

Guillaume Dewaele et al., "Interactive Global and Local Deformations for Virtual Clay" Proceedings of the 11th Pacific Conference on Computer Graphics and Applications, IEEE Computer Society, 2003.

Otmar Hilliges et al., "Interactions in the Air: Adding Further Depth to Interactive Tabletops" Proceedings of 22nd annual ACM Symposium on User Interface and Software and Technology, ACM, 2009, pp. 139-148.

Office Action mailed Apr. 7, 2015, corresponding to Japanese patent application No. 2011-143342.

Office Action mailed Nov. 17, 2015, corresponding to Japanese Patent Application No. 2014-255613.

Office Action mailed Dec. 21, 2015, corresponding to U.S. Appl. No. 13/479,662.

Cui, Tong, Jing Xiao, and Aiguo Song. "Simulation of grasping deformable objects with a virtual human hand." IEEE/RSJ International Conference on Intelligent Robots and Systems, 2008. IROS 2008.

Buchmann, Volkert, et al. "FingARtips: Gesture Based Direct Manipulation in Augmented Reality." Proceedings of the 2nd inter-

(56) References Cited

OTHER PUBLICATIONS national conference on Computer graphics and interactive techniques in Australasia and South East Asia. ACM, 2004.

J.-P. Gourret, N. M. Thalmann, and D. Thalmann. 1989. "Simulation of Object and Human Skin Deformations in a Grasping Task." In Proceedings of the 16th annual conference on Computer Graphics and interactive techniques (SIGGRAPH '89). ACM, New York, NY, USA, 21-30.

Hui, Kin Chuen, and M. C. Ma., "Deforming Virtual Objects with an Instrumented Glove." Computer Graphics International, 1998. Proceedings. IEEE, 1998.

Kolaric, Sinisa, Alberto Raposo, and Marcelo Gattass. "Direct 3D Manipulation Using Vision-Based Recognition of Uninstrumented Hands." X Symposium on Virtual and Augmented Reality. 2008.

Nishino, Hiroaki, Kouichi Utsumiya, and Kazuyoshi Korida. "3D Object Modeling Using Spatial and Pictographic Gestures." Proceedings of the ACM symposium on Virtual reality software and technology. ACM, 1998. pp. 212-220.

Popescu, V., Grigore Burdea, and Mourad Bouzit. "Virtual reality simulation modeling for a haptic glove." Computer Animation, 1999. Proceedings. IEEE, 1999.

Office Action in JP Application No. 2014-255613 mailed Mar. 29, 2016.

Asako Kimura et al,"Function Design and Evaluation of Tool Device Facilitating Pick and Move Manipulation in Spatial Works", Journal of Information Processing Society of Japan, vol. 51, No. 2, Feb. 15, 2010, pp. 314-323, Japan, for which partial translation is attached.

Offce Action in JP Application No. 2014-255613, dated Sep. 13, 2016, for which an explanation of relevance is attached.

Offce Action in JP Application No. 2015-252372, dated Sep. 13, 2016, for which an explanation of relevance is attached.

\* cited by examiner

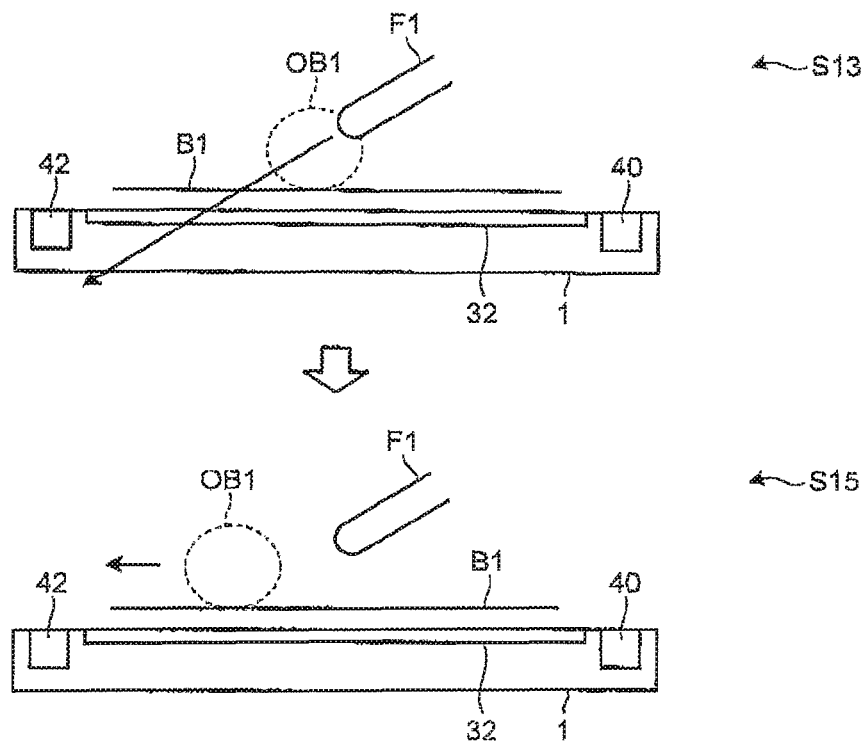

FIG.6

| Type | Fulcrum | Obstacle | Pushed Speed | Change |
|---|---|---|---|---|
| Rigid body | Not exist | Not exist | * | It is moved in the pushed direction according to the pushed amount. |
| | | Fixed obstacle | * | It is moved in the pushed direction according to the pushed amount. It is Not moved after coming in contact with the obstacle. |
| | | Other rigid body | Low | It is moved in the pushed direction according to the pushed amount. After coming in contact with other rigid body, it is moved together with the other rigid body. |
| | | | High | It is moved in the pushed direction according to the pushed amount. On contact with other rigid body, it flicks away the other rigid body. |
| | | Other rigid body (which can be passed through) | * | It is moved in the pushed direction according to the pushed amount. On contact with other rigid body, it is moved so as to pass through the other rigid body. |
| | Exist | Not exist | * | It is rotated around the fulcrum. |

| Type | Material | Change Amount | Pushed Speed | Change |
|---|---|---|---|---|
| Elastic body | Rubber-based | Without limitation | Low | It is deformed in the pushed direction according to the pushed amount. When released, it returns to its original shape. |
| | | | High | It is deformed in the pushed direction according to the pushed amount. Then, it is moved while returning to its original shape. |
| | Metal-based | With limitation | * | It is deformed in the pushed direction within changeable range according to the pushed amount. Then, it is moved while returning to its original shape. |
| | | With limitation | * | When it is pushed in a deformable direction, it is deformed in the pushed direction within changeable range according to the pushed amount. When released, returning to its original shape and being deformed are repeated (vibrated). When it is pushed in any direction other than the deformable direction, it is moved similarly to the rigid body. |

FIG.8

| Type | Change |
|---|---|
| Plastic body | Entire shape is deformed so that the pushed portion dents. |

| Type | Pushed Speed | Change |
|---|---|---|
| Liquid | Low | Object is soaked in liquid. |
| | Medium | Object is soaked in liquid. Ripples spread across the liquid. |
| | High | Object is soaked in liquid. Water splashes. |

| Type | Pushed Speed | Change |
|---|---|---|
| Gas | Low | It is blocked by the object (to float around the periphery thereof). |
| | Medium | It is scattered. |
| | High | Eddy is produced due to turbulent flow in the back side of the moving direction of the object. |

| Type | Combination of Elements | Change |
|---|---|---|
| Aggregate | Not combined | Entire shape as an aggregate is deformed so that the pushed portion dents. |
| | Combined | Entire shape as an aggregate is deformed so that the pushed portion dents. Elements other than the pushed portion are pulled by the element at the pushed portion and are moved. |
| | Not combined (there is attractive force or repulsive force between the elements and the object) | When there is attractive force, the elements within a predetermined distance to the object are attracted to the object without contacting the object. When there is repulsive force, the elements within a predetermined distance to the object are repelled from the object without contacting the object. |

DISPLAY DEVICE

CROSS-REFERENCE TO RELATED APPLICATIONS

The present application is a continuation of U.S. patent application Ser. No. 13/532,885 filed on Jun. 26, 2012, which claims priority from Japanese Application No. 2011-143070, filed on Jun. 28, 2011. The disclosures of all of the above-listed prior-filed applications are hereby incorporated by reference herein in their entirety.

1. TECHNICAL FIELD

The present disclosure relates to a display device.

2. DESCRIPTION OF THE RELATED ART

Some display devices such as mobile phones with a display unit can stereoscopically display an image and so on (see e.g., Japanese Patent Application Laid-open No. 2011-95547). The three-dimensional display is implemented by using binocular disparity.

The three-dimensional display is a user-friendly display manner; however, it has been used just for viewing purposes, and has not been used for improving the convenience of operations.

For the foregoing reasons, there is a need for a display device that can provide the user with convenient operations using the three-dimensional display.

SUMMARY

According to an aspect, a display device includes a display unit, a detecting unit, and a control unit. The display unit stereoscopically displays a display object. The detecting unit detects an object in a three-dimensional space where the display object is stereoscopically displayed. When a movement of the object is detected in the three-dimensional space, the control unit changes the display object according to the movement of the object.

According to another aspect, a display device includes a display unit and a control unit. The display unit stereoscopically displays a display object. When a movement of an object is detected in a three-dimensional space where the display object is stereoscopically displayed, the control unit for changes the display object in the three-dimensional space according to the movement of the object.

BRIEF DESCRIPTION OF THE DRAWINGS

FIG. 4 is a diagram for explaining how to detect an operation of pushing the three-dimensional object and how to change the three-dimensional object according to the detected operation in the first embodiment;

FIG. 5 is a diagram illustrating an example of information stored in object data;

FIG. 6 is a diagram illustrating an example of information stored in action data;

FIG. 7 is a diagram illustrating an example of the information stored in the action data;

FIG. 8 is a diagram illustrating an example of the information stored in the action data;

FIG. 9 is a diagram illustrating an example of the information stored in the action data;

FIG. 10 is a diagram illustrating an example of the information stored in the action data;

FIG. 11 is a diagram illustrating an example of the information stored in the action data;

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone is used to explain as an example of the display device; however, the present invention is not limited to mobile phones. Therefore, the present invention can be applied to a variety of devices, including but not limited to personal handyphone systems (PHS), personal digital assistants (PDA), portable navigation units, personal computers (including but not limited to tablet computers, netbooks etc.), media players, portable electronic reading devices, and gaming devices. The present invention can also be applied to stationary electronic devices that have a plurality of display units.

Figure 1:
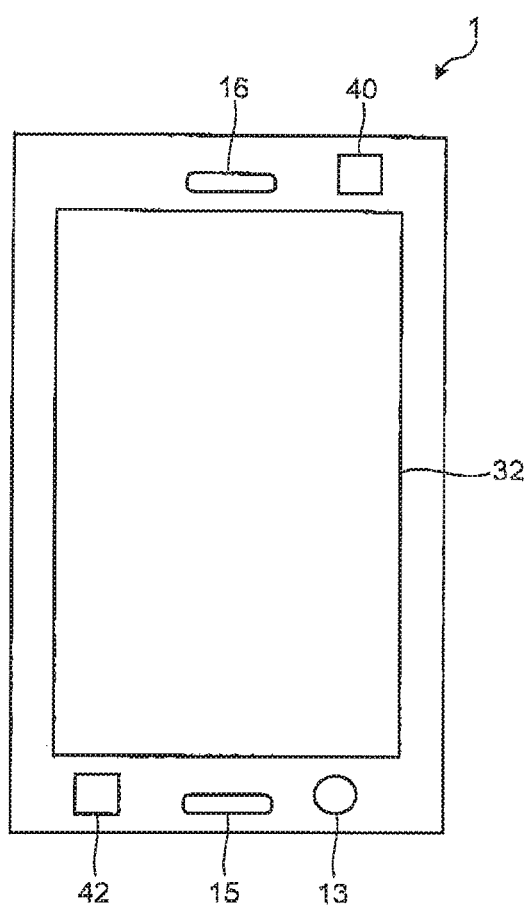
FIG. 1 is a front view of a mobile phone according to a first embodiment.
Figure 2:
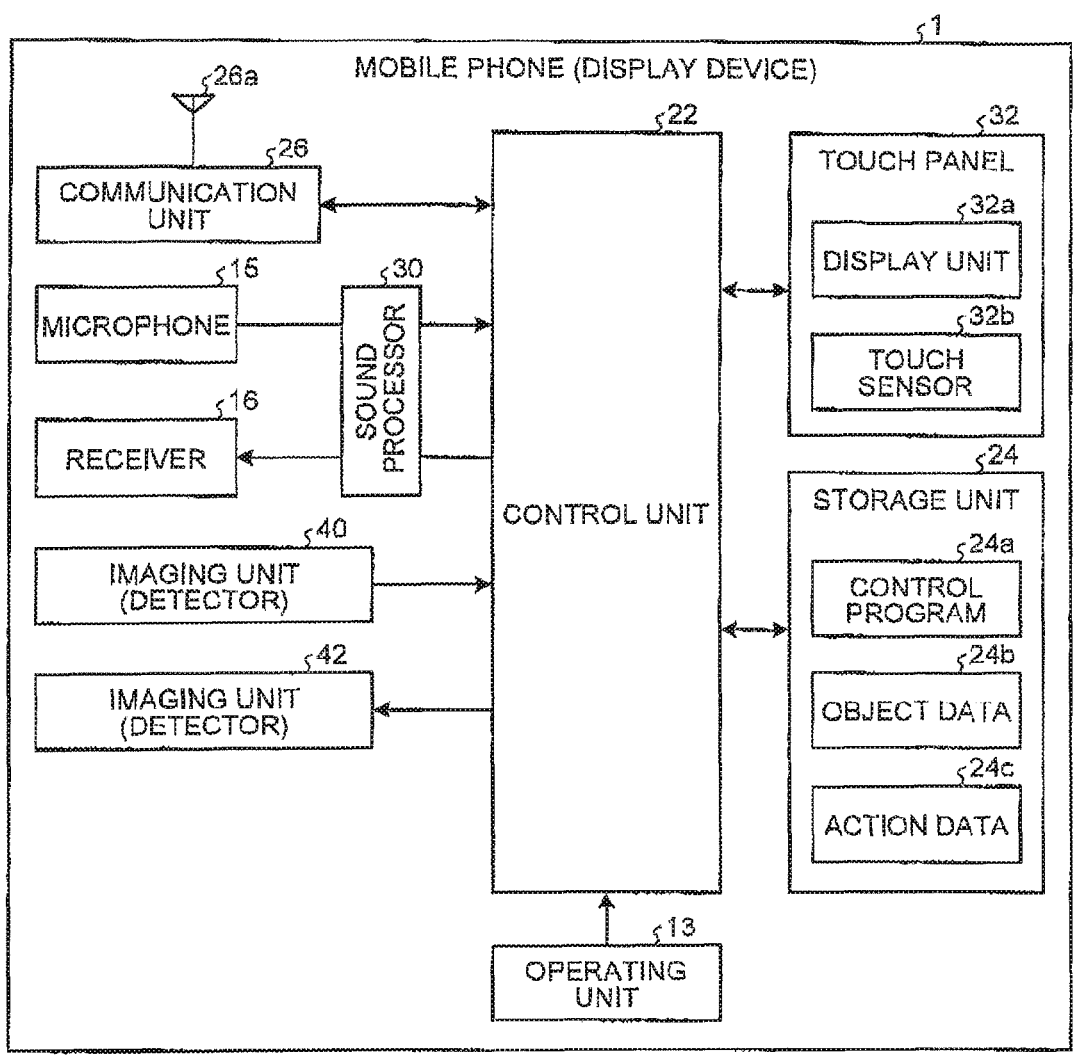
FIG. 2 is a block diagram of the mobile phone according to the first embodiment.

First of all, the configuration of a mobile phone (display device) 1 according to a first embodiment will be explained below with reference to FIG. 1 and FIG. 2. FIG. 1 is a front view of the mobile phone 1. FIG. 2 is a block diagram of the mobile phone 1.

As illustrated in FIG. 1 and FIG. 2, the mobile phone 1 includes an operating unit 13, a microphone 15, a receiver 16, a control unit 22, a storage unit 24, a communication unit 26, a sound processor 30, a touch panel 32, an imaging unit 40, and an imaging unit 42. The operating unit 13, the microphone 15, the receiver 16, the touch panel 32, and the imaging unit 40 are exposed to the front surface of the mobile phone 1.

The operating unit 13 has physical button, and outputs a signal corresponding to a pressed button to the control unit 22. In the example illustrated in FIG. 1, the operating unit 13 has only one button; however, the operating unit 13 may have a plurality of buttons.

The microphone 15 acquires an external sound. The receiver 16 outputs a voice of a call partner during a phone call. The sound processor 30 converts the sound input from the microphone 15 to a digital signal and outputs the digital signal to the control unit 22. The sound processor 30 also decodes a digital signal input from the control unit 22 and outputs the decoded signal to the receiver 16.

The communication unit 26 includes an antenna 26a, and establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the communication unit 26.

The touch panel 32 displays various pieces of information such as characters, graphics, and images, and detects an input operation performed on a display area such as icon, button, and character input area. The touch panel 32 is structured with a display unit 32a and a touch sensor 32b so as to overlap each other.

The display unit 32a includes a display device such as a liquid crystal display (LCD) or an organic electro-luminescence display (OELD), and displays various pieces of information according to a control signal input from the control unit 22. The touch sensor 32b detects an input operation performed on the surface of the touch panel 32, and outputs a signal corresponding to the detected input operation to the control unit 22. The detection method in which the touch sensor 32b detects various operations may be any detection method, such as a capacitive type detection method, a resistive type detection method, and a pressure sensitive type detection method.

The touch panel 32 can display a three-dimensional object. A "three-dimensional object" is a display object such as an image and a shape created so as to look as if the display object is three-dimensional using disparity. The method of displaying the three-dimensional object may be a method of realizing a stereoscopic vision using a tool such as glasses, or may be a method of realizing a stereoscopic vision with the naked eye.

The imaging units 40 and 42 electronically photograph an image using an image sensor such as a charge-coupled device (CCD) image sensor or a complementary metal oxide semiconductor (CMOS) image sensor. Each of the imaging units 40 and 42 converts a photographed image to a signal and outputs the signal to the control unit 22. The imaging units 40 and 42 also function as a detector that detects an object for selecting and operating a three-dimensional object in a space in which the three-dimensional object is stereoscopically displayed (hereinafter, also referred to "three-dimensional space", "stereoscopic vision space" or "visual space").

The imaging units 40 and 42 are configured to set a field angle and layout so that, even if an object such as a finger is located in any part of the three-dimensional space, the object can be photographed. The imaging units 40 and 42 may be a device that acquires an image of visible light or may be a device that acquires an image of invisible light such as infrared rays.

The control unit 22 includes a central processing unit (CPU) being a processing unit and a memory being a storage unit, and implements various functions by executing programs using these hardware resources. Specifically, the control unit 22 reads a program or data stored in the storage unit 24 to load it to the memory, and causes the CPU to execute instructions contained in the program loaded to the memory. The control unit 22 performs read/write of data from/to the memory and the storage unit 24, and controls operations of the communication unit 26, the display unit 32a, and the like according to the execution result of the instructions executed by the CPU. When the CPU executes instructions, the data loaded to the memory and the signal input from the touch sensor 32b or so are used as part of parameters and determination conditions.

The storage unit 24 includes one or more non-transitory storage medium, for example, a nonvolatile memory (such as ROM, EPROM, flash card etc.) and/or a storage device (such as magnetic storage device, optical storage device, solid-state storage device etc.), and stores therein various programs and data. Examples of the program stored in the storage unit 24 include a control program 24a. Examples of the data stored in the storage unit 24 include object data 24b and action data 24c. The storage unit 24 may include a combination of a portable storage medium such as a memory card and a reader/writer for reading/writing data from/to the storage medium. In this case, the control program 24a, the object data 24b, and the action data 24c may be stored in the storage medium. The control program 24a, the object data 24b, and the action data 24c may be acquired from any other device such as a server through communication by the communication unit 26.

The control program 24a provides functions for various controls to operate the mobile phone 1. The function provided by the control program 24a includes a function for controlling a display of a three-dimensional object on the touch panel 32 and a function for detecting a user's operation performed for the three-dimensional object displayed by the touch panel 32.

The object data 24b contains information for shapes and characteristics of a three-dimensional object. The object data 24b is used to display the three-dimensional object. The action data 24c contains information for how an operation performed for a displayed three-dimensional object acts for the three-dimensional object. When the operation performed for the displayed three-dimensional object is detected, the action data 24c is used to change the three-dimensional object. The change mentioned here includes movement, rotation, deformation, deletion, and so on.

Figure 3:
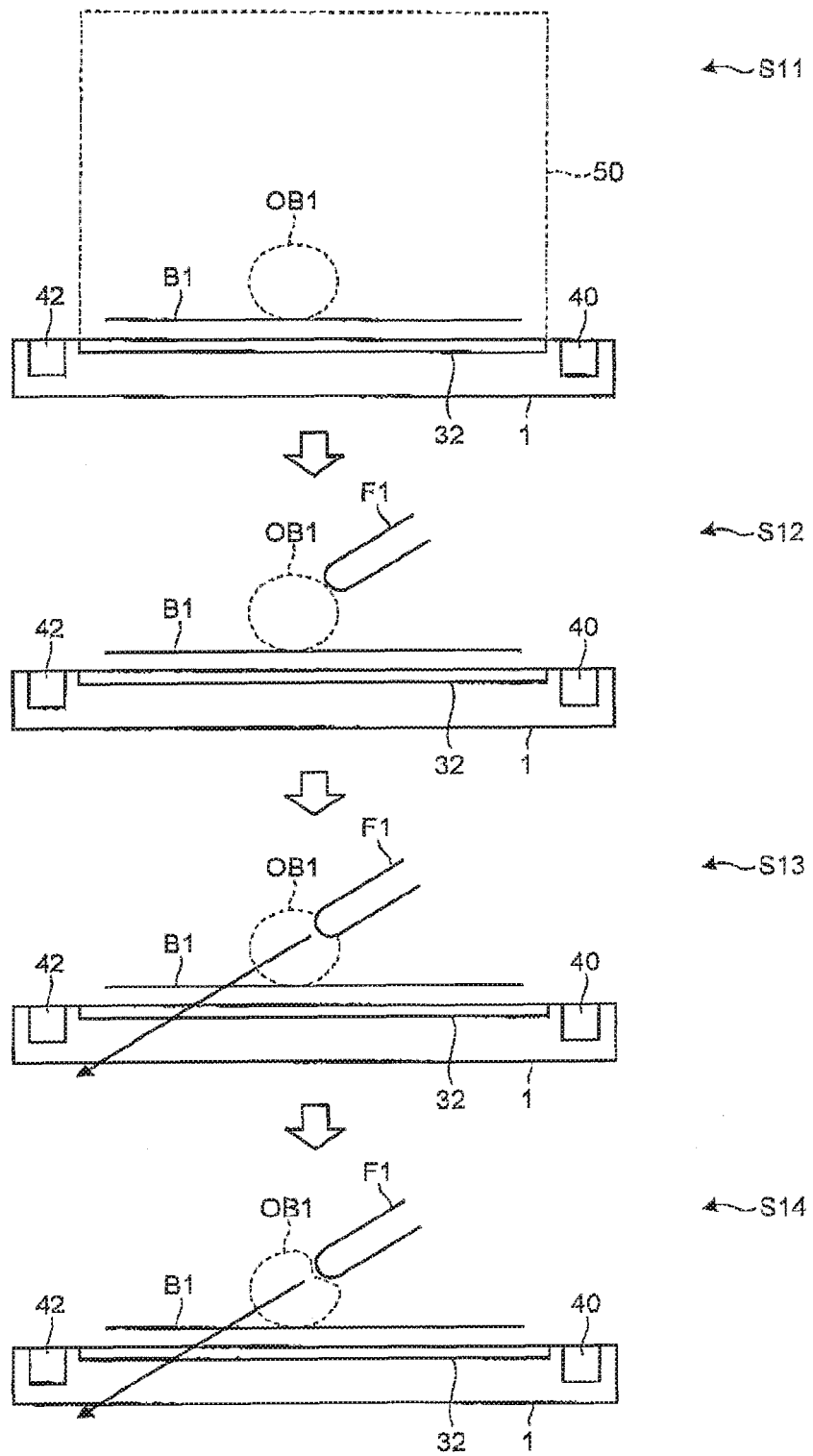
FIG. 3 is a diagram for explaining how to detect an operation of pushing a three-dimensional object and how to change the three-dimensional object according to the detected operation in the first embodiment.

Then, detection of an operation for pushing a three-dimensional object and a change of the three-dimensional object according to the detected operation will be explained below with reference to FIG. 3 and FIG. 4. FIG. 3 and FIG. 4 are diagrams for explaining how to detect an operation of pushing the three-dimensional object and how to change the three-dimensional object according to the detected operation. At Step S11 illustrated in FIG. 3, the touch panel 32 stereoscopically displays a three-dimensional object OB1 in a three-dimensional space 50. The three-dimensional object OB1 is, for example, an object resembling a ball. At Step S11, the touch panel 32 also displays a bottom surface B1 that supports the three-dimensional object OB1.

At Step S12, the user places a finger F1 on a location where it is in contact with the three-dimensional object OB1, and keeps the finger F1 still as it is. When an actual object is detected in the three-dimensional space and a state in which the object keeps in contact with the three-dimensional object OB1 continues for a longer period of time than a predetermined time, the mobile phone 1 determines that the three-dimensional object OB1 is selected as an operation target. The mobile phone 1 changes a display mode of the three-dimensional object OB1, or so, to notify the user that the three-dimensional object OB1 is selected as the operation target.

The determination as to whether the object is in contact with the three-dimensional object OB1 is performed based on an actual position of the object in the three-dimensional space, a shape of the three-dimensional object OB1, and a calculated position of the three-dimensional object OB1 in the three-dimensional space. The shape of the three-dimensional object OB1 is defined in the object data 24b.

The actual position of the object is calculated based on images photographed by the imaging units 40 and 42. The actual position of the object may be calculated based on the size of the previously registered object, the sizes of the object in the images, and the positions of the object in the images. The actual position of the object may also be calculated by comparing the size and the position of the object in the image photographed by the imaging unit 40 with the size and the position of the object in the image photographed by the imaging unit 42. The detection of the object such as the finger may be implemented using a known technology. When the object is the finger, the process may be performed by setting a position of the tip of the finger as a position of the object.

A calculated position of the three-dimensional object OB1 in the three-dimensional space is calculated based on a position of the three-dimensional object OB1 on the display surface of the touch panel 32 and an amount of "floating" of the three-dimensional object OB1 in the three-dimensional space. The amount of floating of the three-dimensional object OB1 in the three-dimensional space may be a value determined upon display, or may be a value calculated from a difference between positions of the three-dimensional object OB1 in an image for a right eye and in an image for a left eye, which are used to stereoscopically display the three-dimensional object OB1.

The notification indicating that it is selected as the operation target is implemented by, for example, changing the whole color of the three-dimensional object OB1 or changing a color near a location, within the surface of the three-dimensional object OB1, where the three-dimensional object OB1 is in contact with the object. Instead of or in addition to such visual notification, a sound and/or a vibration may be used to perform the notification.

In this way, when the state where the real object such as the finger is in contact with the three-dimensional object OB1 is continuously detected for a longer period of time than a predetermined time, the mobile phone 1 determines that the three-dimensional object OB1 is selected as the operation target. By adding the continuous detection of the contact state for a longer period of time than the predetermined time to the condition, an unintended three-dimensional object can be prevented from being selected as an operation target during the process of moving the finger in order to operate any other three-dimensional object.

It is assumed that after the selection of the three-dimensional object OB1 as the operation target, as illustrated at Step S13, the user causes the finger F1 to enter the inside of the three-dimensional object OB1 as if he/she pushes the three-dimensional object OB1. When the operation of causing the object to enter the inside of the three-dimensional object OB1 selected as the operation target is detected, the mobile phone 1 changes the three-dimensional object OB1 according to the operation. How to change the three-dimensional object OB1 is determined based on the type of the three-dimensional object OB1 defined in the object data 24b and the rule of the change defined in the action data 24c in association with the type.

For example, it is assumed that it is defined in the object data 24b that the three-dimensional object OB1 is an elastic body and it is also defined in the action data 24c that if the elastic body is pushed, then it is deformed in its pushed direction according to the pushed amount. In this case, as illustrated at S14, the mobile phone 1 changes the three-dimensional object OB1 so that a portion which the finger F1 has entered is pushed to dent.

Alternatively, it is assumed that it is defined in the object data 24b that the three-dimensional object OB1 is a rigid body and it is also defined in the action data 24c that if the rigid body is pushed, then it is moved in its pushed direction according to the pushed amount. In this case, as illustrated at Step S15 in FIG. 4, the mobile phone 1 moves the three-dimensional object OB1 in the direction of forward movement as if it is pushed away by the finger F1. At Step S15 in FIG. 4, the three-dimensional object OB1 is supported by the bottom surface B1, so that the three-dimensional object OB1 moves according to a component of the force applied by the object, that is, a component that acts in a direction parallel to the bottom surface B1.

In this way, when the operation of pushing the three-dimensional object OB1 is detected, the three-dimensional object OB1 is changed based on the object data 24b and the action data 24c, which enables the three-dimensional object OB1 to be variously changed according to each operation. The pushing operation is an operation used in various scenes in the real world, and therefore by detecting an operation of pushing the three-dimensional object OB1 and executing the corresponding process, intuitive and user-friendly operability can be achieved.

The object used to operate the three-dimensional object is not limited to the finger, and therefore may be a hand, a foot, a stick, a tool, or so. A way to change the three-dimensional object OB1 according to the pushing operation may follow actual physical law or may be that which is actually impossible.

When the pushed direction of the three-dimensional object is not parallel to the display surface of the touch panel 32, that is, when the moving direction of the detected object intersects the display surface of the touch panel 32 or intersects a horizontal plane parallel to the display surface thereof, the mobile phone 1 changes the three-dimensional object according to the operation. In this way, by stereoscopically determining the operation of pushing the three-dimensional object, various operations can be performed for the three-dimensional object. To stereoscopically determine the operation of pushing the three-dimensional object, a plurality of imaging units are desirably prepared to photograph the finger F1 or so from different directions so that an obstacle will not cause a blind spot.

The object data 24b and the action data 24c illustrated in FIG. 2 will be explained in more detail below with reference to FIG. 5 to FIG. 11. FIG. 5 is a diagram illustrating an example of information stored in the object data 24b. FIG. 6 to FIG. 11 are diagrams illustrating examples of information stored in the action data 24c.

As illustrated in FIG. 5, the object data 24b stores therein information including type, shape information, color, transparency, and so on for each three-dimensional object. The type indicates physical characteristics of each three-dimensional object. The type is represented by a value such as "Rigid body" and "Elastic body". The shape information is information indicating the shape of each three-dimensional object. The shape information is, for example, a set of vertex coordinates of faces that form the three-dimensional object. The color is surface color of each three-dimensional object. The transparency is a degree in which each three-dimensional object transmits light. The object data 24b can hold information for a plurality of three-dimensional objects.

The action data 24c stores therein information for changes made when the pushing operation is detected, for each type of three-dimensional objects. As illustrated in FIG. 6, when the type of the three-dimensional object is "Rigid body", a change made when the pushing operation is detected differs according to existence of a fulcrum, existence of an obstacle in its pushed direction, and a pushed speed. The obstacle mentioned here indicates some other three-dimensional object. Whether the pushed speed is high or low is determined based on a threshold.

When there is no fulcrum in the three-dimensional object and there is no obstacle in its pushed direction, the three-dimensional object is displayed so as to move in its pushed direction according to a pushed amount. Examples of the three-dimensional object displayed in this manner include blocks, a pen, a book, etc. As for the way to move, whether the three-dimensional object is slid or rotated may be determined based on the shape thereof. Whether the three-dimensional object is moved together with a pushing object or is moved separately from a pushing object as if it is flicked by the pushing object may be determined based on the pushed speed, or may be determined based on a calculated value or a set value of frictional resistance between the three-dimensional object and the bottom surface.

When there is no fulcrum in the three-dimensional object and there is a fixed obstacle in its pushed direction, then the three-dimensional object is displayed so as to move in its pushed direction according to the pushed amount and stop the movement when it comes in contact with the obstacle. Examples of the three-dimensional object displayed in this manner include blocks, a pen, a book, etc. When the pushed speed is high, the three-dimensional object may break the obstacle and continue to move. When the three-dimensional object comes in contact with an obstacle while being moved separately from a pushing object as if it is flicked by the pushing object, the three-dimensional object may be moved in an opposite direction as if it has bounced off the obstacle.

When there is no fulcrum in the three-dimensional object, there is any other rigid body which is not fixed in its pushed direction, and the pushed speed is low, then the three-dimensional object is displayed so as to move in its pushed direction according to the pushed amount and move together with the any other rigid body after the three-dimensional object comes in contact with the any other rigid body. When there is no fulcrum in the three-dimensional object, there is any other rigid body which is not fixed in its pushed direction, and the pushed speed is high, then the three-dimensional object is displayed so as to move in the pushed direction according to the pushed amount. After the three-dimensional object comes in contact with the any other rigid body, the rigid body is displayed so as to move as if it is flicked by the three-dimensional object. After coming in contact with any other rigid body, the three-dimensional object may be stopped on that spot, or may continue to move with the speed being slowed down. Examples of a combination of the three-dimensional object and the any other rigid body displayed in this manner include a combination of a ball and a pin of bowling, a combination of marbles, etc.

When there is no fulcrum in the three-dimensional object, there is any other rigid body which is not fixed in its pushed direction, and the three-dimensional object can pass through the any other rigid body, then the three-dimensional object is displayed so as to move in its pushed direction according to the pushed amount and pass through the any other rigid body even after the three-dimensional object comes in contact with the any other rigid body, to continuously move as it is. In reality, a rigid body is impossible to pass through any other rigid body; however, by enabling such a pass, fresh experiment can be provided to the user. Examples of a combination of the three-dimensional object and the any other rigid body displayed in this manner include a combination of a ball and a pin of bowling, a combination of marbles, etc. It may be set that the three-dimensional object does not pass through any other rigid body when a threshold is provided with respect to the pushed speed and the pushed speed is slower than the threshold.

When there is a fulcrum in the three-dimensional object, the three-dimensional object is displayed so as to rotate around the fulcrum according to its pushed direction and amount. The rotation mentioned here may be continuous rotation through 360 degrees or may be a reciprocating swing motion within a predetermined turning range. Examples of the three-dimensional object displayed in this manner include a pendulum, a sand bag for boxing, a windmill, etc.

As illustrated in FIG. 7, when the type of the three-dimensional object is "Elastic body", a change made when a pushing operation is detected differs according to a material, existence of limitation to its change amount, and a pushed speed. The material mentioned here is an assumed material of the three-dimensional object, which is defined in the object data 24b.

When the material of the three-dimensional object is a rubber-based material without limitation to its change amount and the pushed speed is low, the three-dimensional object is displayed so as to deform in the pushed direction according to the pushed amount and return to its original shape when it is released from the pushed state. When the material of the three-dimensional object is a rubber-based material without limitation to its change amount and the pushed speed is high, the three-dimensional object is displayed so as to deform in its pushed direction according to the pushed amount. Thereafter the three-dimensional object is displayed so as to move in the pushed direction as if it is flicked away while returning to its original shape. Examples of the three-dimensional object displayed in this manner include a rubber ball, a rubber eraser, etc.

When the material of the three-dimensional object is a rubber-based material with limitation to the change amount, the three-dimensional object is displayed so as to deform in its pushed direction within a deformable range according to the pushed amount. Then, when the subsequent pushing operation is detected, the three-dimensional object is displayed so as to move in the pushed direction while returning to its original shape. Examples of the three-dimensional object displayed in this manner include a rubber ball, a rubber eraser, etc.

When the material of the three-dimensional object is a metal-based material, the three-dimensional object is displayed so that it is deformed in its pushed direction within a deformable range according to the pushed amount. Then, when it is released from the pushed state, the three-dimensional object is displayed so that returning to its original shape and deformation are repeated (so as to vibrate). If the three-dimensional object is pushed in any direction other than the deformable direction, the three-dimensional object moves similarly to the rigid body. Examples of the three-dimensional object displayed in this manner include a plate spring, a helical spring, etc.

As illustrated in FIG. 8, when the type of the three-dimensional object is "Plastic body", the three-dimensional object is displayed so that its pushed portion dents and the entire shape is thereby deformed. Examples of the three-dimensional object displayed in this manner include clay, etc.

As illustrated in FIG. 9, when the type of the three-dimensional object is "Liquid", a change made when the pushing operation is detected differs according to the pushed speed. When the pushed speed is low, a pushing object is displayed so as to be soaked in the three-dimensional object, that is, in the liquid. When the pushed speed is medium, the pushing object is displayed so that it is soaked in the liquid with ripples spreading across the liquid. When the pushed speed is high, the pushing object is displayed so that it is soaked in the liquid with water splashes from the liquid. Examples of the three-dimensional object displayed in this manner include water in a cup, etc.

As illustrated in FIG. 10, when the type of the three-dimensional object is "Gas", a change made when the pushing operation is detected differs according to the pushed speed. When the pushed speed is low, the three-dimensional object, that is, the gas is displayed so that it is blocked by the pushing object to float around the periphery thereof. When the pushed speed is medium, the gas is displayed so as to be scattered by the pushing object. When the pushed speed is high, the gas is displayed so that eddy is produced in the gas due to turbulent flow in the back side of the moving direction of the pushing object. Examples of the three-dimensional object displayed in this manner include smoke, etc.

As illustrated in FIG. 11, when the type of the three-dimensional object is "Aggregate", a change made when the pushing operation is detected differs according to how elements of the aggregate are combined. When the elements of the aggregate are not combined, the three-dimensional object is displayed so that its pushed portion dents and the entire shape as the aggregate is thereby changed. Examples of the three-dimensional object displayed in this manner include sands, sugar, etc.

When the elements of the aggregate are combined, the three-dimensional object is displayed so that its pushed portion dents and the entire shape as the aggregate is thereby changed. Moreover, it may be displayed so that any elements other than the pushed portion move by being pulled by the element of the pushed portion. Examples of the three-dimensional object displayed in this manner include a chain, etc.

When the elements of the aggregate are not combined but attractive force or repulsive force acts between the elements and a pushing object, the three-dimensional object is displayed so as to move without contacting the pushing object. When the attractive force acts between the elements and the pushing object, the three-dimensional object is attracted to the pushing object without contacting the pushing object when it enters within a predetermined distance to the pushing object. When the repulsive force acts between the elements and the pushing object, the three-dimensional object is repelled from the pushing object without contacting the pushing object when it enters within a predetermined distance to the pushing object. Examples of a combination of the three-dimensional object and the pushing object displayed in this manner include a combination of iron powder and a magnet, etc.

In this manner, by changing the three-dimensional object based on the information stored in the object data 24*b* and the information stored in the action data 24*c*, the three-dimensional object can be variously changed according to the pushing operation. The information stored in the object data 24*b* and in the action data 24*c* is not limited to the example, and therefore may be appropriately varied depending on intended use or so. For example, settings may be made so that the way to change the three-dimensional object is switched according to the type and the size of the pushing object and/or the size of a contact area between the pushing object and the three-dimensional object.

Figure 12:
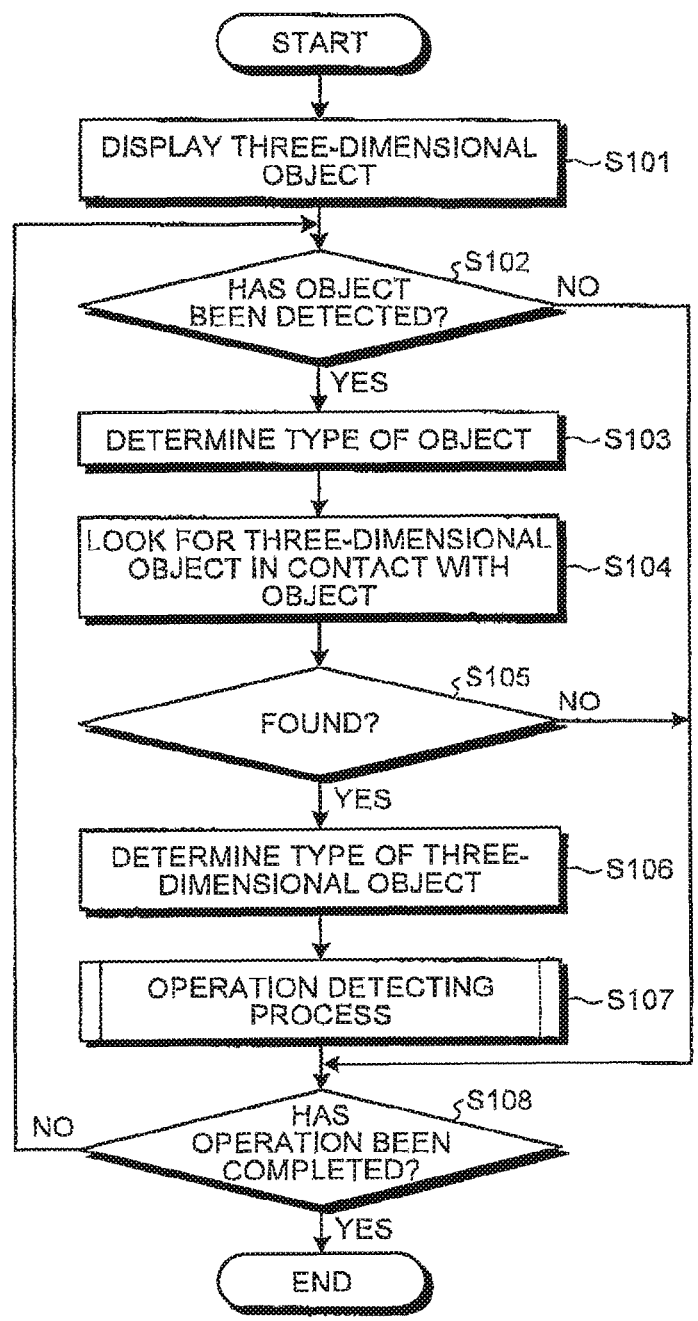
FIG. 12 is a flowchart of a procedure of a contact detecting process.

Then, a procedure performed by the mobile phone 1 related to the operation of pushing the three-dimensional object will be explained with reference to FIG. 12 and FIG. 13. FIG. 12 is a flowchart of a procedure of the contact detecting process of the three-dimensional object. The procedure illustrated in FIG. 12 is implemented by the control unit 22 executing the control program 24*a* triggered by detection of a predetermined operation or the like.

As illustrated in FIG. 12, first of all, at Step S101, the control unit 22 stereoscopically displays a three-dimensional object based on the object data 24*b*. The object data 24*b* may be previously stored in the storage unit 24 or may be acquired from any other device such as a server through communication by the communication unit 26.

Subsequently, at Step S102, the control unit 22 determines whether detecting units, that is, the imaging units 40 and 42 have detected a predetermined object. The predetermined object is, for example, a user's finger. When the predetermined object has not been detected (No at Step S102), then at Step S108, the control unit 22 determines whether operation completion has been detected.

For example, the operation completion may be detected when a predetermined operation is performed for the operating unit 13, or may be detected when a predetermined operation is performed for the touch panel 32. The operation completion may also be detected when a predetermined user's hand gesture is photographed by at least one of the imaging units 40 and 42. When the operation completion has been detected (Yes at Step S108), the control unit 22 ends the contact detecting process. When the operation completion has not been detected (No at Step S108), the control unit 22 re-executes Step S102 and the subsequent steps.

When the predetermined object has been detected (Yes at Step S102), then at Step S103, the control unit 22 determines the type of the predetermined object. The type of the predetermined object is determined based on the size, the shape, the color, and so on of the object in images photographed by the imaging units 40 and 42. Subsequently, at Step S104, the control unit 22 looks for a three-dimensional object in contact with the predetermined object.

When there is no three-dimensional object in contact with the predetermined object (No at Step S105), then at Step S108, the control unit 22 determines whether the operation completion has been detected. When the operation completion has been detected (Yes at Step S108), the control unit 22 ends the contact detecting process. When the operation completion has not been detected (No at Step S108), the control unit 22 re-executes Step S102 and the subsequent steps.

When the three-dimensional object in contact with the predetermined object has been found (Yes at Step S105), then at Step S106, the control unit 22 determines the type of the three-dimensional object in contact with the predetermined object based on the object data 24*b*. Then at Step S107, the control unit 22 executes an operation detecting process explained later. Thereafter, at Step S108, the control unit 22 determines whether the operation completion has been detected. When the operation completion has been detected (Yes at Step S108), the control unit 22 ends the contact detecting process. When the operation completion has not been detected (No at Step S108), the control unit 22 re-executes Step S102 and the subsequent steps.

Figure 13:
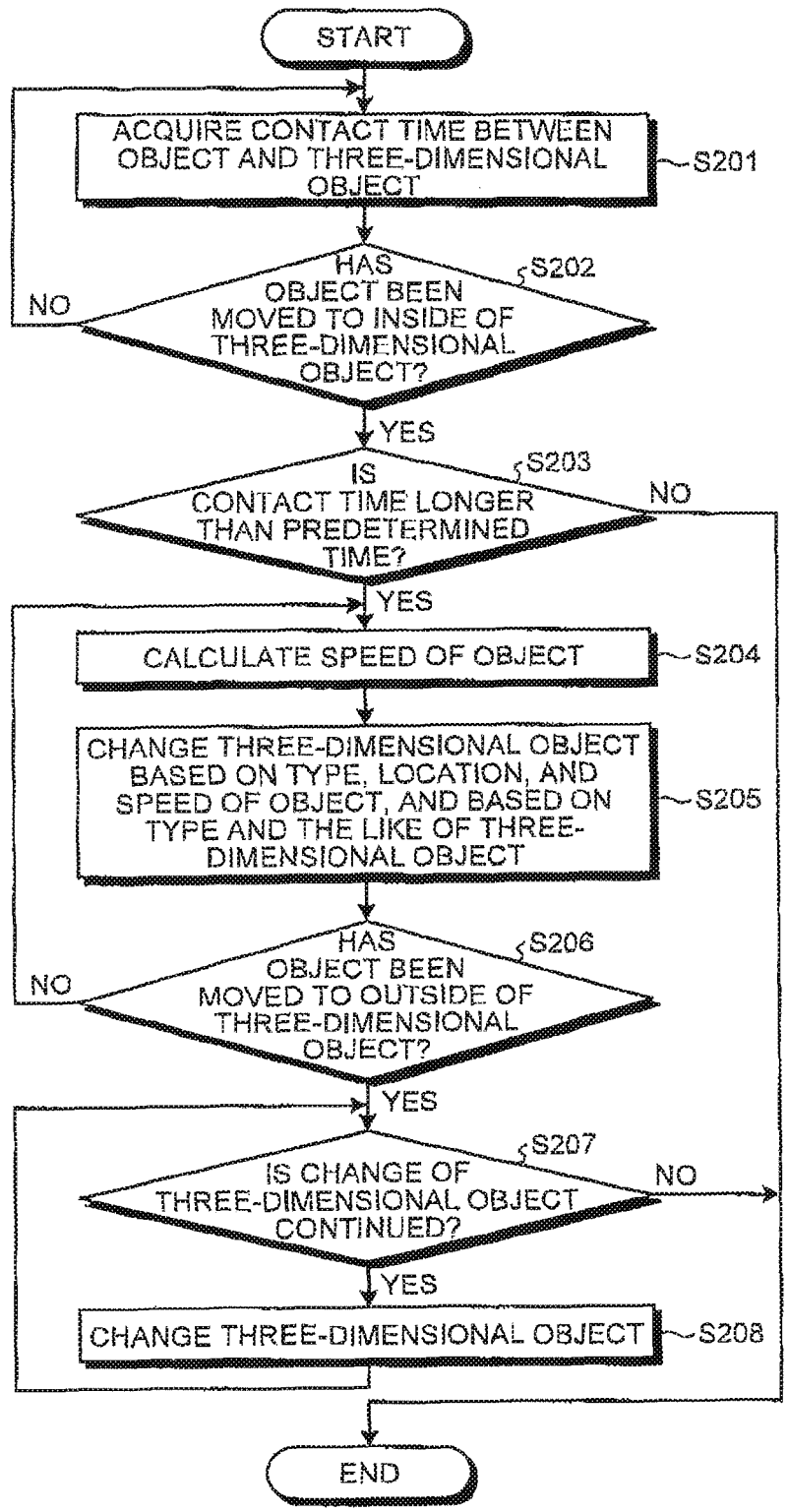
FIG. 13 is a flowchart of a procedure of an operation detecting process.

FIG. 13 is a flowchart of a procedure of the operation detecting process. The procedure illustrated in FIG. 13 is implemented by the control unit 22 executing the control program 24*a*.

As illustrated in FIG. 13, first of all, at Step S201, the control unit 22 acquires a contact time for which the predetermined object keeps in contact with the three-dimensional object. Then at Step S202, the control unit 22 determines whether the predetermined object has been moved to the inside of the three-dimensional object. When the predetermined object has not been moved to the inside of the three-dimensional object (No at Step S202), the control unit 22 re-executes Step S201 and the subsequent step.

When the predetermined object has been moved to the inside of the three-dimensional object (Yes at Step S202), then at Step S203, the control unit 22 determines whether the contact time is longer than a predetermined time. When the contact time is not longer than the predetermined time (No at Step S203), it is determined that the three-dimensional object is not the operation target, and therefore the control unit 22 ends the operation detecting process.

When the contact time is longer than the predetermined time (Yes at Step S203), then at Step S204, the control unit 22 calculates a speed of the predetermined object. At Step S205, the control unit changes the three-dimensional object based on the type, the location, and the speed of the predetermined object and based on the type and the like of the three-dimensional object. A specific way to change the three-dimensional object is determined according to the action data 24*c*.

Subsequently, the control unit 22 determines at Step S206 whether the predetermined object has been moved to the outside of the three-dimensional object. When the predetermined object has not been moved to the outside of the three-dimensional object, that is, when the pushing operation is continued (No at Step S206), the control unit 22 re-executes Step S204 and the subsequent steps.

When the predetermined object has been moved to the outside of the three-dimensional object, that is, when the three-dimensional object has been released (Yes at Step S206), then at Step S207, the control unit 22 determines whether the change of the three-dimensional object is continued. For example, when it is defined in the action data 24*c* that the vibration is continued for a predetermined time even after the release, it is determined that the change of the three-dimensional object is continued.

When the change of the three-dimensional object is continued (Yes at Step S207), then at Step S208, the control unit 22 changes the three-dimensional object, and thereafter re-executes Step S207 and the subsequent step. When the change of the three-dimensional object is not continued (No at Step S207), the control unit 22 ends the operation detecting process.

As explained above, the first embodiment is configured to variously change the three-dimensional object according to the pushing operation, thus providing a user-friendly operation method to users.

A second embodiment will be explained below. The mobile phone 1 according to the second embodiment is different in a procedure of the operation detecting process executed based on the functions provided by the control program 24*a* from that according to the first embodiment. However, in terms of the hardware, the mobile phone 1 according to the second embodiment is configured in the same manner as that of the mobile phone 1 according to the first embodiment. Therefore, in the second embodiment, explanation that overlaps with the explanation in the first embodiment is omitted, and the operation detecting process will be mainly explained below.

Figure 14:
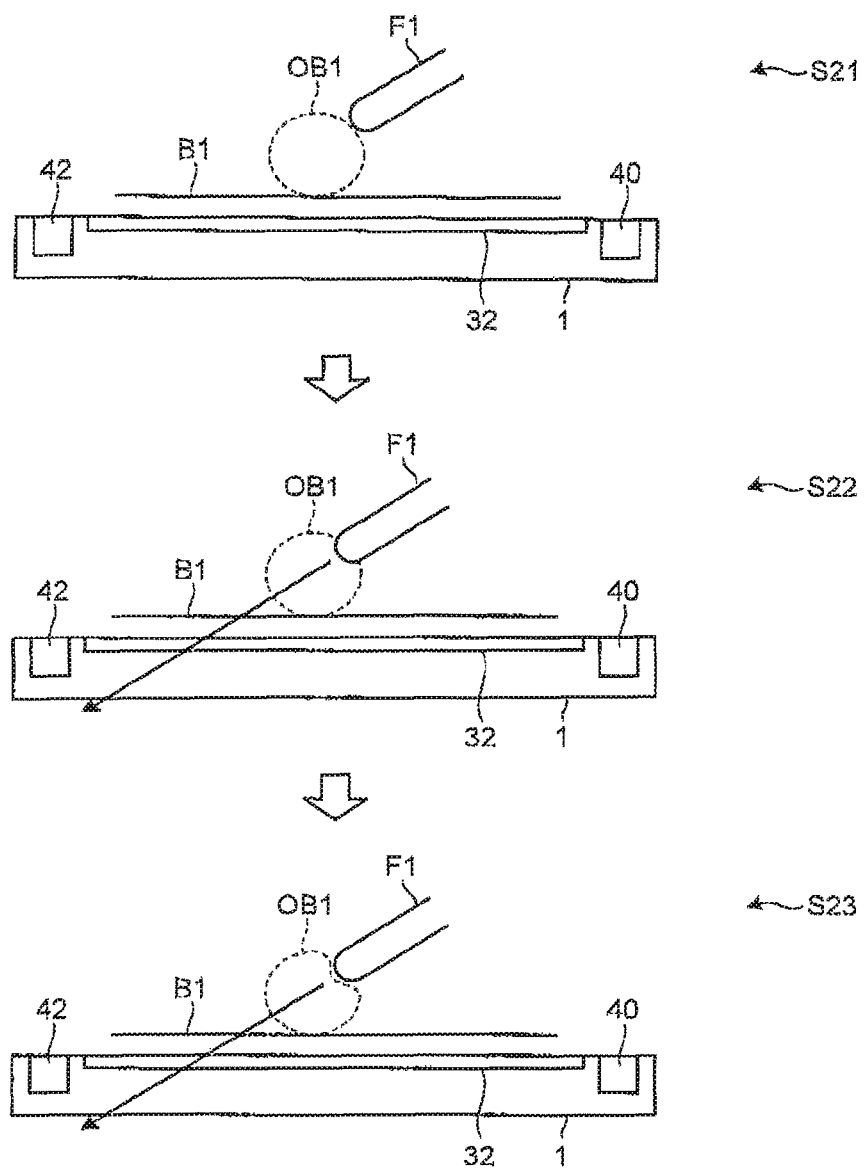
FIG. 14 is a diagram for explaining how to detect an operation of pushing a three-dimensional object and how to change the three-dimensional object according to the detected operation in a second embodiment.

First of all, detection of an operation of pushing a three-dimensional object and a change of the three-dimensional object according to the detected operation will be explained with reference to FIG. 14. FIG. 14 is a diagram for explaining how to detect an operation of pushing the three-dimensional object and how to change the three-dimensional object according to the detected operation. At Step S21 illustrated in FIG. 14, the user brings the finger F1 into contact with the three-dimensional object, and at Step S22, the user causes the finger F1 to enter the inside of the three-dimensional object OB1.

When an actual object has been detected in the three-dimensional space and the state in which the object moves to the inside of the three-dimensional object after coming in contact with the three-dimensional object OB1 is continued for a longer period of time than the predetermined time, then the mobile phone 1 determines that the three-dimensional object OB1 has been selected as the operation target. The mobile phone 1 changes the display mode of the three-dimensional object OB1, or so, to notify the user that the three-dimensional object OB1 has been selected as the operation target. Moreover, as illustrated at Step S23, the mobile phone 1 changes the three-dimensional object OB1 according to the operation by the finger F1 after the detection of the contact as if it is already selected as an object of the pushing operation at the stage of Step S21.

In this way, it is configured that the pushing operation can be detected even if the object does not remain in that spot after a contact between the object and the three-dimensional object is detected. Therefore, the user can quickly start the operation of pushing the three-dimensional object. By adding whether the state in which the object after the contact moves to the inside of the three-dimensional object OB1 continues for a longer period of time than the predetermined time to the condition, an unintended three-dimensional object can be prevented from being selected as an operation target during the process of moving the finger in order to operate any other three-dimensional object.

Figure 15:
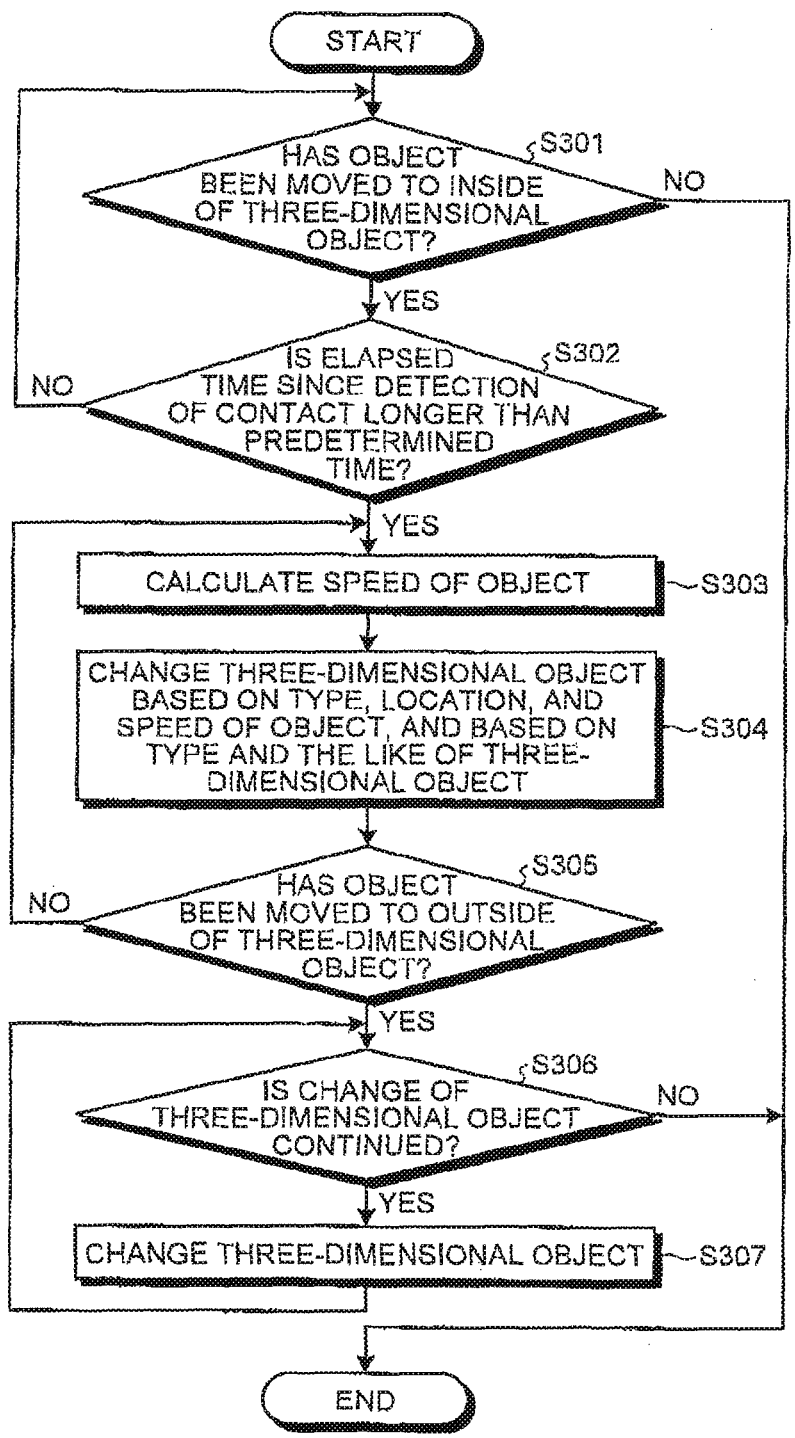
FIG. 15 is a flowchart of a procedure of an operation detecting process.

Then, a procedure of the operation detecting process according to the second embodiment will be explained below with reference to FIG. 15. FIG. 15 is a flowchart of the procedure of the operation detecting process. The procedure illustrated in FIG. 15 is implemented by the control unit 22 executing the control program 24*a*. It should be noted that the procedure of the contact detecting process is the same as that illustrated in FIG. 12.

As illustrated in FIG. 15, first of all, at Step S301, the control unit 22 determines whether the predetermined object has been moved to the inside of the three-dimensional object. When the predetermined object has not been moved to the inside of the three-dimensional object (No at Step S301), it is determined that the three-dimensional object is not the operation target, and therefore the control unit 22 ends the operation detecting process.

When the predetermined object has been moved to the inside of the three-dimensional object (Yes at Step S301), then at Step S302, the control unit 22 determines whether an elapsed time since the detection of the contact is longer than a predetermined time. When the elapsed time is not longer than the predetermined time (No at Step S302), the control unit 22 re-executes Step S301 and the subsequent step.

When the elapsed time is longer than the predetermined time (Yes at Step S302), then at Step S303, the control unit 22 calculates a speed of the predetermined object. At Step S304, the control unit changes the three-dimensional object based on the type, the location, and the speed of the predetermined object and based on the type and the like of the three-dimensional object. A specific way to change the three-dimensional object is determined according to the action data 24c.

Subsequently, the control unit 22 determines at Step S305 whether the predetermined object has been moved to the outside of the three-dimensional object. When the predetermined object has not been moved to the outside of the three-dimensional object, that is, when the pushing operation is continued (No at Step S305), the control unit 22 re-executes Step S303 and the subsequent steps.

When the predetermined object has been moved to the outside of the three-dimensional object, that is, when the three-dimensional object has been released (Yes at Step S305), then at Step S306, the control unit 22 determines whether the change of the three-dimensional object is continued. For example, when it is defined in the action data 24c that the vibration is continued for a predetermined time even after the release, it is determined that the change of the three-dimensional object is continued.

When the change of the three-dimensional object is continued (Yes at Step S306), then at Step S307, the control unit 22 changes the three-dimensional object, and thereafter re-executes Step S306 and the subsequent step. When the change of the three-dimensional object is not continued (No at Step S306), the control unit 22 ends the operation detecting process.

As explained above, the second embodiment is configured to recognize the pushing operation even when the state in which the object such as the finger is in contact with the three-dimensional object does not continue for a longer period of time than the predetermined time. Therefore, the user can quickly start the operation of pushing the three-dimensional object.

A third embodiment will be explained below. The mobile phone 1 according to the third embodiment is different in a procedure of the operation detecting process executed based on the functions provided by the control program 24a from that according to the first embodiment. However, in terms of the hardware, the mobile phone 1 according to the third embodiment is configured in the same manner as that of the mobile phone 1 according to the first embodiment. Therefore, in the third embodiment, explanation that overlaps with the explanation in the first embodiment is omitted, and the operation detecting process will be mainly explained below.

Figure 16:
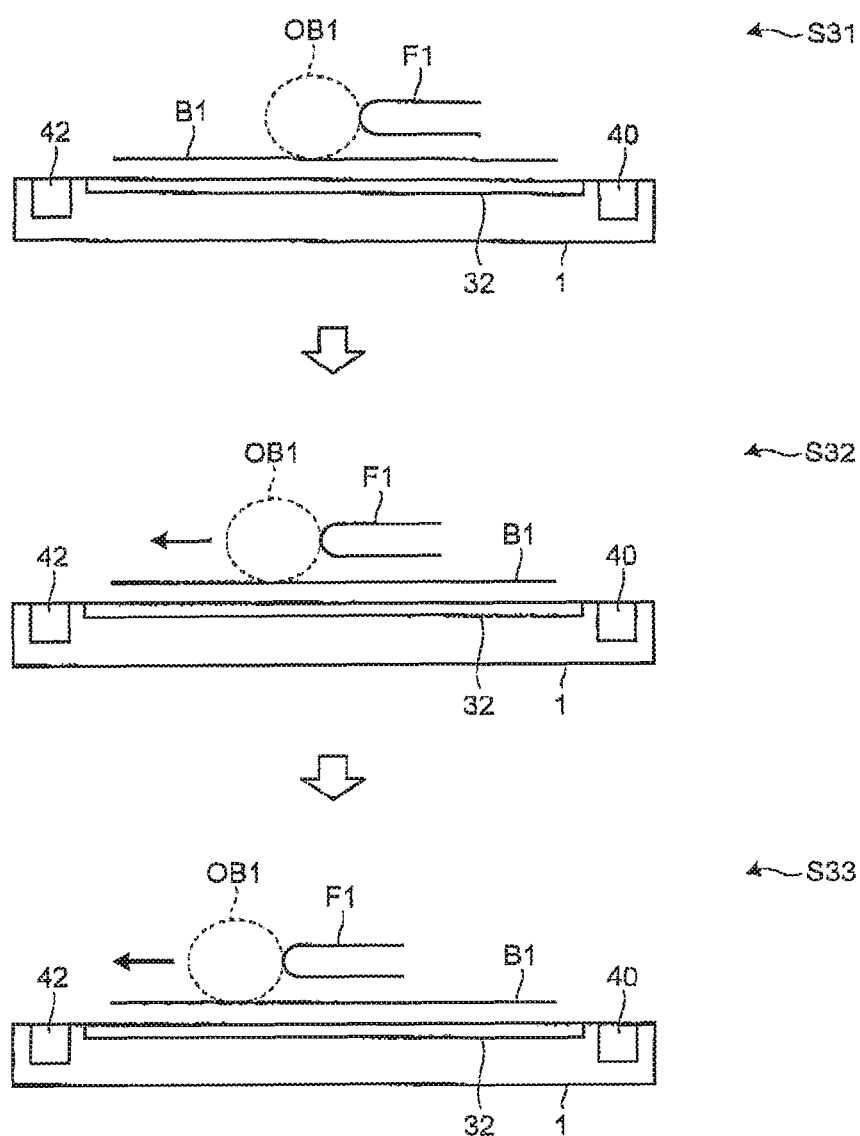
FIG. 16 is a diagram for explaining how to detect an operation of pushing a three-dimensional object and how to change the three-dimensional object according to the detected operation in a third embodiment.
Figure 17:
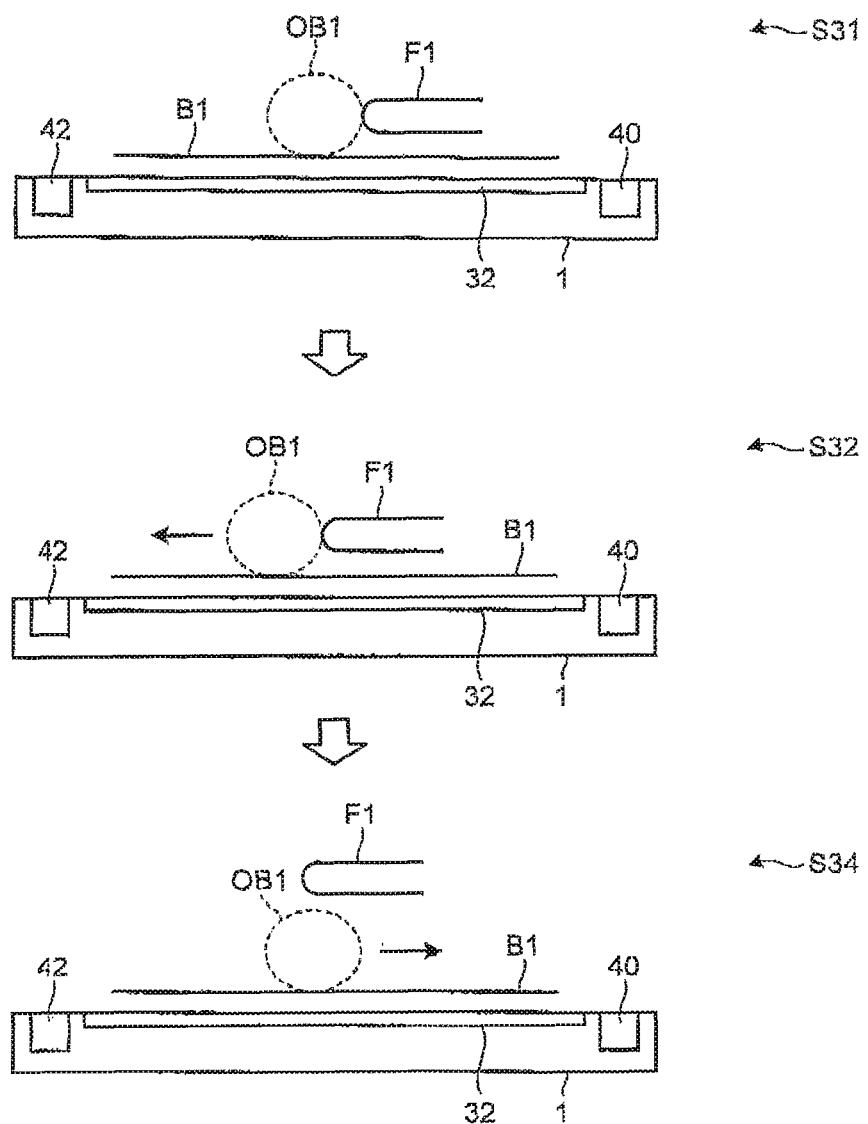
FIG. 17 is a diagram for explaining how to detect an operation of pushing the three-dimensional object and how to change the three-dimensional object according to the detected operation in the third embodiment.

First of all, detection of an operation of pushing a three-dimensional object and a change of the three-dimensional object according to the detected operation will be explained with reference to FIG. 16 and FIG. 17. FIG. 16 and FIG. 17 are diagrams for explaining how to detect an operation of pushing the three-dimensional object and how to change the three-dimensional object according to the detected operation. At Step S31 illustrated in FIG. 16, the touch panel 32 stereoscopically displays the three-dimensional object OB1 in the three-dimensional space. The user brings the finger F1 into contact with the three-dimensional object.

It is assumed that the user causes the finger F1 to enter the inside of the three-dimensional object OB1. When it is detected that the object in contact with the three-dimensional object OB1 has been moved to the inside of the three-dimensional object OB1, then as illustrated at Step S32, the mobile phone 1 changes the three-dimensional object OB1, from that point on, according to the operation by the finger F1. In the example of FIG. 16, at Step S32, the three-dimensional object OB1 starts moving in synchronization with movement of the finger F1.

As illustrated at Step S33, the mobile phone 1 determines the three-dimensional object OB1 as the operation target at the stage when the movement of the finger F1 to the inside of the three-dimensional object OB1 has been continued for a longer period of time than the predetermined time. The mobile phone 1 changes the display mode of the three-dimensional object OB1, or so, to notify the user that the three-dimensional object OB1 is determined as the operation target. Thereafter, the mobile phone 1 also continues changing the three-dimensional object OB1 while the movement of the finger F1 to the inside of the three-dimensional object OB1 is detected.

As illustrated at Step S34 in FIG. 17, when the movement of the finger F1 to the inside of the three-dimensional object OB1 becomes undetectable before the predetermined time elapses, the mobile phone 1 adds a reverse change to the change added so far, to the three-dimensional object OB1. Consequently, the three-dimensional object OB1 is displayed at the same position as that at the stage of Step S31 in the same state. The speed of the reverse change added to the three-dimensional object OB1 may be higher than the speed at which the change is added to the three-dimensional object OB1 so far. That is, the three-dimensional object OB1 may be reversely changed as if it is reversely reproduced at a high speed.

In this way, by starting adding the change to the three-dimensional object from the stage when the entry of the object to the inside of the three-dimensional object is detected, the user can recognize that the three-dimensional object is being selected before the selection is determined. As a result, the user is able to know, at an early point, whether an intended three-dimensional object is selected. When an unintended three-dimensional object is selected, the user can return the unintentionally selected three-dimensional object to its original state by stopping the operation before the predetermined time elapses.

Until the movement of the finger F1 to the inside of the three-dimensional object OB1 is continued for a longer period of time than the predetermined time, the three-dimensional object with the change added thereto may be displayed in a mode (e.g., translucent mode) different from the normal mode or from the mode in which the selection as the operation target is determined. By changing the display mode in this manner, the user can easily determine the state of the three-dimensional object.

Figure 18:
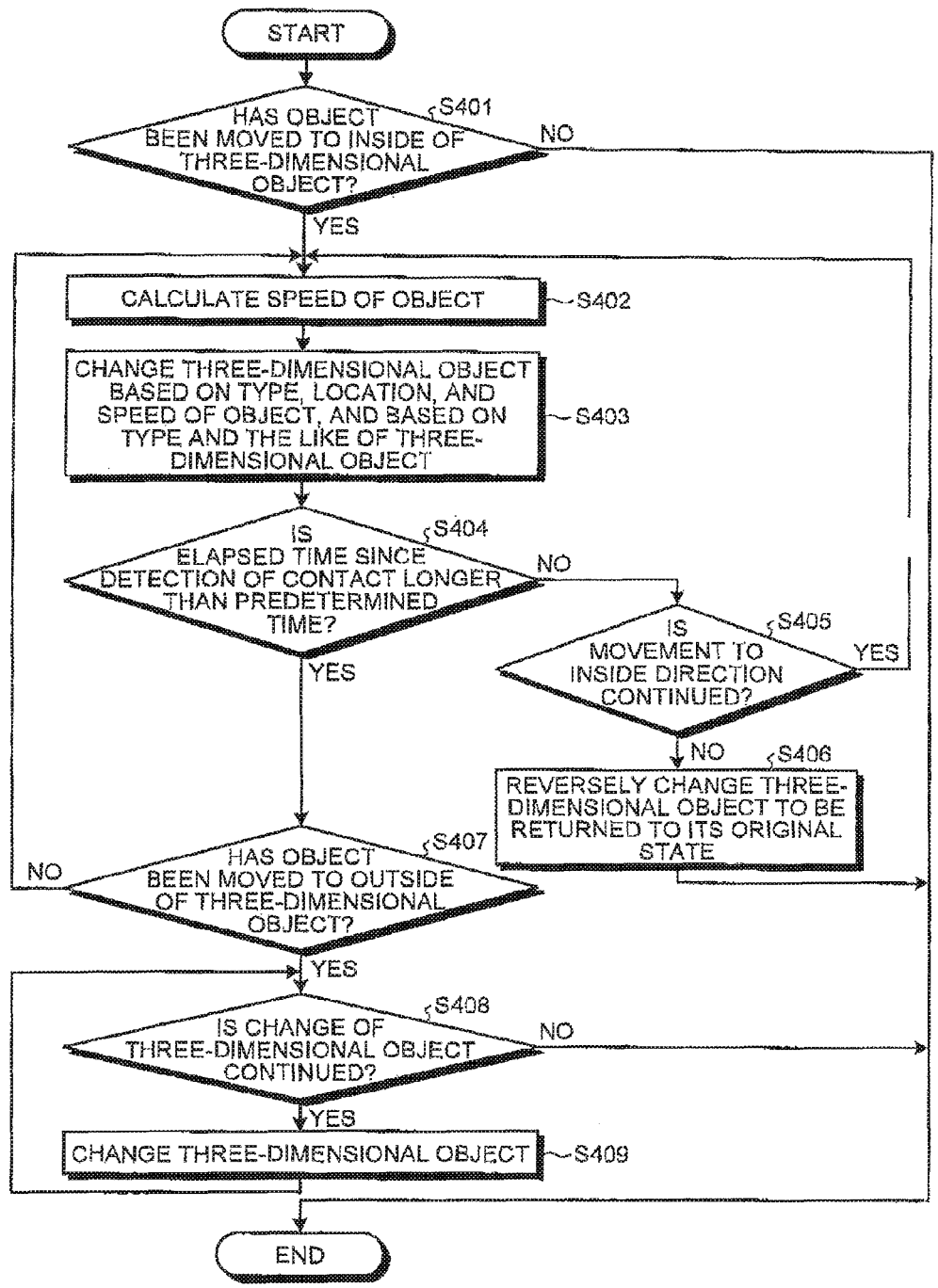
FIG. 18 is a flowchart of a procedure of an operation detecting process.

Then, a procedure of the operation detecting process according to the third embodiment will be explained below with reference to FIG. 18. FIG. 18 is a flowchart of the procedure of the operation detecting process. The procedure illustrated in FIG. 18 is implemented by the control unit 22 executing the control program 24a. It should be noted that the procedure of the contact detecting process is the same as that illustrated in FIG. 12.

As illustrated in FIG. 18, first of all, at Step S401, the control unit 22 determines whether the predetermined object has been moved to the inside of the three-dimensional object. When the predetermined object has not been moved to the inside of the three-dimensional object (No at Step S401), it is determined that the three-dimensional object is not the operation target, and therefore the control unit 22 ends the operation detecting process.

When the predetermined object has been moved to the inside of the three-dimensional object (Yes at Step S401), then at Step S402, the control unit 22 calculates a speed of the predetermined object. At Step S403, the control unit changes the three-dimensional object based on the type, the location, and the speed of the predetermined object and based on the type and the like of the three-dimensional object. A specific way to change the three-dimensional object is determined according to the action data 24c.

Subsequently, at Step S404, the control unit 22 determines whether an elapsed time since the detection of the contact is longer than a predetermined time. When the elapsed time is not longer than the predetermined time, that is, when the three-dimensional object is not determined as an object of the pushing operation (No at Step S404), then at Step S405, the control unit 22 determines whether the movement of the predetermined object to the inside direction of the three-dimensional object is continued.

When the movement of the predetermined object to the inside direction of the three-dimensional object is continued (Yes at Step S405), the control unit 22 re-executes Step S402 and the subsequent steps. When the movement of the predetermined object to the inside direction of the three-dimensional object is not continued (No at Step S405), then at Step S406, the control unit 22 reversely changes the three-dimensional object OB1 to be returned to its original state. The control unit 22 then ends the operation detecting process.

When the elapsed time since the detection of the contact is longer than the predetermined time (Yes at Step S404), then at Step S407, the control unit 22 determines whether the predetermined object has been moved to the outside of the three-dimensional object. When the predetermined object has not been moved to the outside of the three-dimensional object, that is, when the pushing operation is continued (No at Step S407), the control unit 22 re-executes Step S402 and the subsequent steps.

When the predetermined object has been moved to the outside of the three-dimensional object, that is, when the three-dimensional object has been released (Yes at Step S407), then at Step S408, the control unit 22 determines whether the change of the three-dimensional object is continued. For example, when it is defined in the action data 24c that the vibration is continued for a predetermined time even after the release, it is determined that the change of the three-dimensional object is continued.

When the change of the three-dimensional object is continued (Yes at Step S408), then at Step S409, the control unit 22 changes the three-dimensional object, and thereafter re-executes Step S408 and the subsequent step. When the change of the three-dimensional object is not continued (No at Step S408), the control unit 22 ends the operation detecting process.

As explained above, the third embodiment is configured to change the three-dimensional object according to the operation from the time when the pushing operation is detected. Therefore, the user can thereby easily recognize the three-dimensional object determined as a target of the pushing operation.

A fourth embodiment will be explained below. The embodiments are configured to detect the object that operates the three-dimensional object based on the images photographed by the imaging units; however, some other detection methods may be used. For example, a capacitive type touch sensor can detect a position of a finger that does not touch the touch sensor by increasing its sensitivity. Therefore, an example of using the touch sensor as a detector that detects an object operating a three-dimensional object is explained in the fourth embodiment. In the following explanation, the same signs as these of the already explained components are assigned to the same components as the already explained components. Explanation that overlaps with the above explanation may be omitted.

Figure 19:
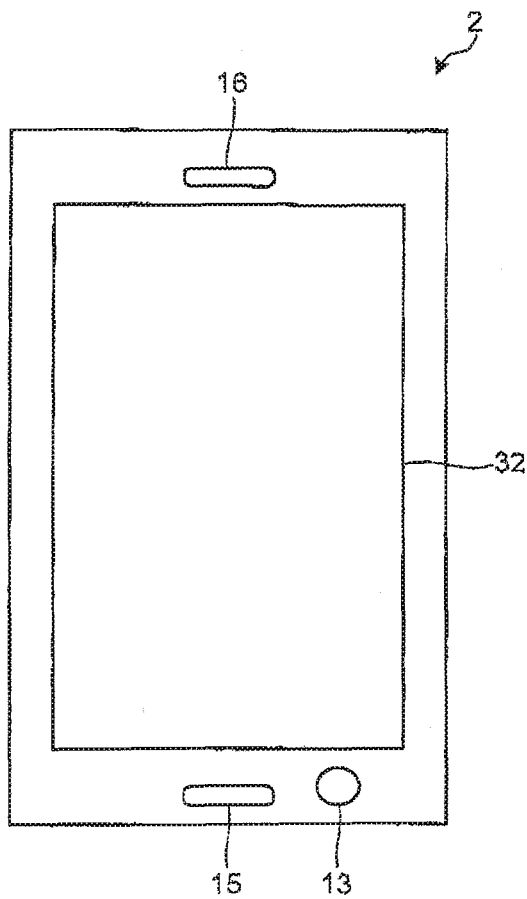
FIG. 19 is a front view of a mobile phone according to a fourth embodiment.
Figure 20:
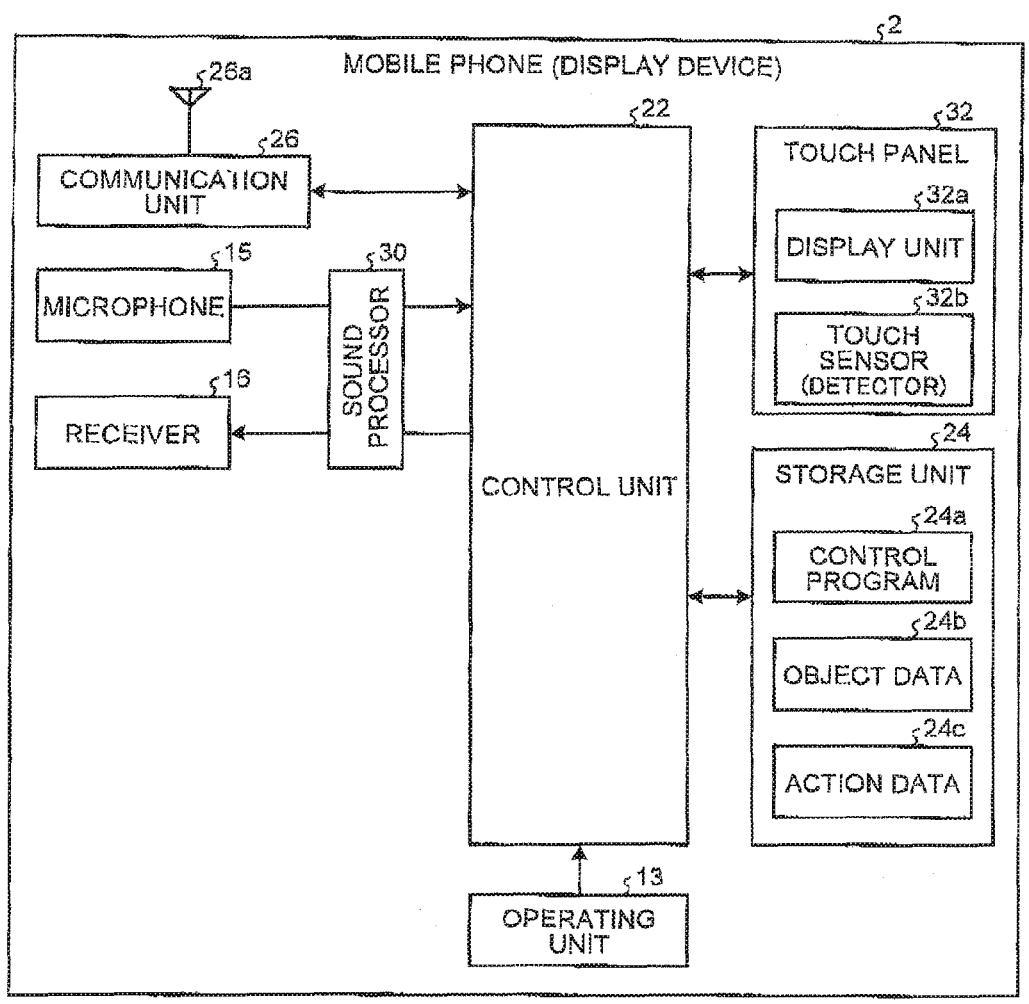
FIG. 20 is a block diagram of the mobile phone according to the fourth embodiment.

First of all, a configuration of a mobile phone (display device) 2 according to the fourth embodiment will be explained below with reference to FIG. 19 and FIG. 20. FIG. 19 is a front view of the mobile phone 2. FIG. 20 is a block diagram of the mobile phone 2.

As illustrated in FIG. 19 and FIG. 20, the mobile phone 2 includes the operating unit 13, the microphone 15, the receiver 16, the control unit 22, the storage unit 24, the communication unit 26, the sound processor 30, and the touch panel 32.

The touch panel 32 displays various pieces of information such as characters, graphics, and images, and detects an input operation performed on a predetermined display area such as icon, button, and character input area. The touch panel 32 is structured with the display unit 32a and the touch sensor 32b so as to overlap each other. The touch sensor 32b according to the present embodiment is a capacitive type touch sensor. The touch sensor 32b functions also as a detector that detects fingers operating a three-dimensional object.

Figure 21:
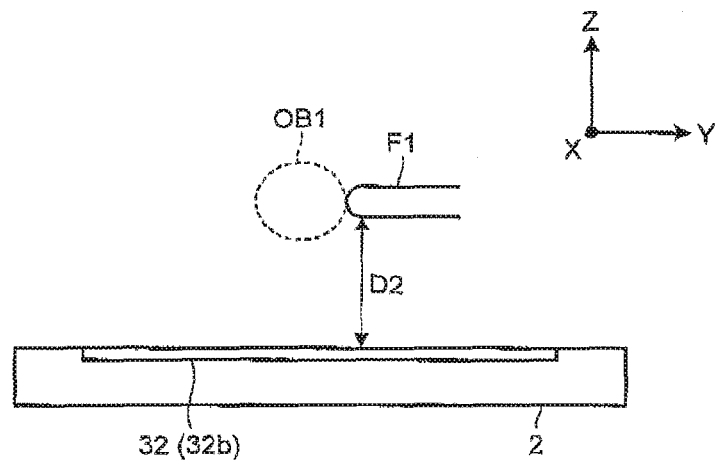
FIG. 21 is a diagram for explaining how to detect an operation performed for a three-dimensional object in the fourth embodiment.

Then, the detection of an operation performed for a three-dimensional object will be explained with reference to FIG. 21. FIG. 21 is a diagram for explaining how to detect an operation performed for a three-dimensional object. As illustrated in FIG. 21, the touch panel 32 stereoscopically displays the three-dimensional object OB1 in the three-dimensional space. Also, as illustrated in FIG. 21, the user brings the finger F1 into contact with the three-dimensional object OB1.

The mobile phone 2 detects a location of the finger F1 using the touch sensor 32b. The touch sensor 32b can detect the location of the finger F1 in an X-axis direction and a Y-axis direction by increasing its sensitivity even if, for example, a distance from the finger F1 to the surface of the touch panel 32 in a Z-axis direction is about 10 cm. The touch sensor 32b can also detect a distance D2 from the finger F1 to the surface of the touch panel 32 in the Z-axis direction based on the magnitude of the capacitance.

The mobile phone 2 can detect the contact between the finger F1 and the three-dimensional object OB1 and can detect the operation of pushing the three-dimensional object OB1 performed by the finger F1, based on the thus detected location of the finger F1 in the three-dimensional space.

As explained above, the fourth embodiment is configured to use the touch sensor as a detector, so that the operation performed for the three-dimensional object can be detected even by a display device without the imaging unit.

To detect the operation performed for the three-dimensional object, the imaging unit and the touch sensor may be used in combination with each other. When the imaging unit is combined with the touch sensor, respective detection results may be averaged to specify the location of the finger F1. A weighted average may be used, such that weighting of the detection results of the touch sensor is increased in an area near the touch panel 32 where the imaging unit 40 is difficult to acquire the image of the finger F1 and weighting of the detection results of the imaging unit 40 is increased in an area far from the touch panel 32 where the detection precision of the touch sensor becomes low.

Figure 22:
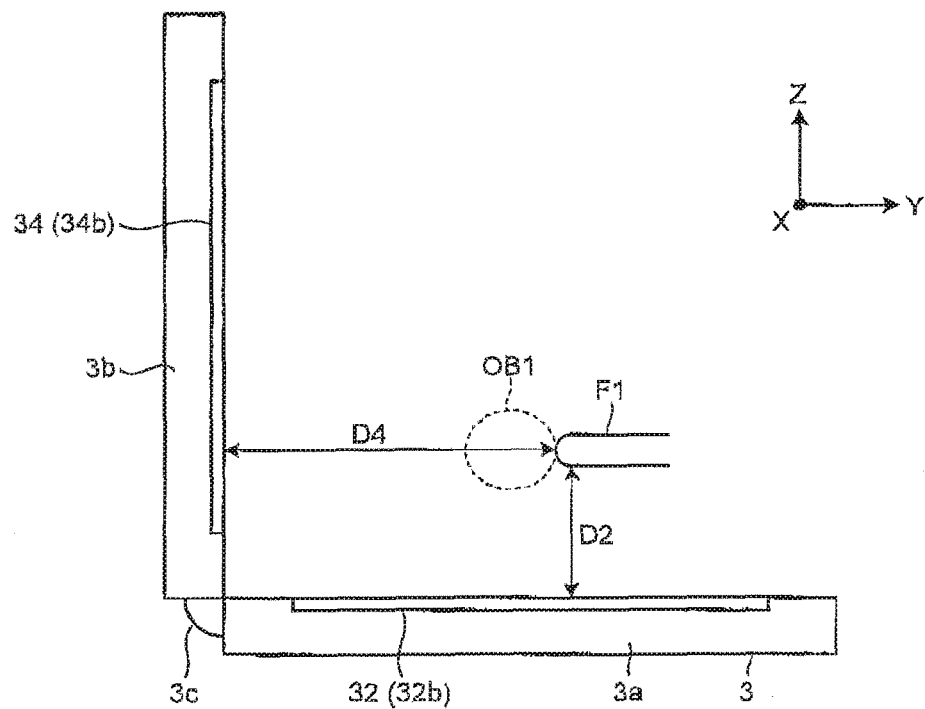
FIG. 22 is a diagram of a modified example of the mobile phone according to the fourth embodiment.

To prevent the touch sensor from not detecting a location of a finger with high precision because any other finger or so may block the finger, a plurality of touch sensors may be used to detect an operation performed for the three-dimensional object. FIG. 22 is a diagram of a configuration example of a mobile phone 3 that uses a plurality of touch sensors to detect an operation performed for the three-dimensional object.

The mobile phone 3 includes a first housing 3a, a second housing 3b, and a hinge 3c. The hinge 3c couples the first housing 3a and the second housing 3b so as to be openable and closable. The first housing 3a is provided with the touch panel 32 including the touch sensor 32b, and the second housing 3b is provided with a touch panel 34 including a touch sensor 34b. As illustrated in FIG. 22, the touch sensor 32b and the touch sensor 34b contact the three-dimensional space at different angles when the first housing 3a and the second housing 3b are fixed to each other at an angle of about 90 degrees.

The touch sensor 32b can detect the location of the finger F1 in the X-axis direction and the Y-axis direction. The touch sensor 32b can also detect the distance D2 from the finger F1 to the surface of the touch panel 32 in the Z-axis direction, based on the magnitude of the capacitance. The touch sensor 34b can detect the location of the finger F1 in the X-axis direction and the Z-axis direction. The touch sensor 34b can also detect a distance D4 from the finger F1 to the surface of the touch panel 34 in the Y-axis direction, based on the magnitude of the capacitance.

In this manner, by detecting the finger F1 from different directions, even if there is some obstacle, the location of the finger F1 can be detected from either one of the directions. When the finger F1 is detected from the different directions, one of the touch panels may display the three-dimensional object, and the other touch panel may stop displaying or may two-dimensionally display guidance or so. The touch panel which does not display the three-dimensional object may be configured as a mere touch sensor.

Examples of the application of the display device explained in the embodiments and modified examples thereof will be explained below. A three-dimensional object (display object) being an operation target may be any object resembling an object actually existing such as a book, blocks, a spoon, chopsticks, playing cards, clay, and an instrument, or may be any object not existing such as a virtual avatar, a character in a game, and an augmented reality (AR) tag in virtual reality. The change added to the three-dimensional object according to the detected operation is not limited to the movement, the deformation, the deletion, or the like. The change added to the three-dimensional object according to the pushing operation is not limited to these of the embodiments, and may therefore be changed according to the type of the three-dimensional object.

For example, when a three-dimensional object resembling clay (hereinafter, "clay") is determined as an operation target, the clay may be deformed according to the pushing operation, so that the user can form the clay into an arbitrary shape. In addition, the viscosity of the clay may be decreased with the elapse of time as if the clay is getting dry. When an operation of soaking a finger or hand in water being the three-dimensional object and pushing the clay with the finger or hand is detected, the viscosity of the clay may be increased.

When a three-dimensional object resembling a phonograph record (hereinafter, "phonograph record") is determined as an operation target, it may be set so that the phonograph record is rotated around its center and a sound is reproduced according to the pushing operation. By synchronizing the rotation with the sound reproduction, a technique such as a scratch performed by a disc jockey may be virtually achieved.

The aspects of the present invention represented in the embodiments can be arbitrarily modified without departing from the spirit of the present invention. Moreover, the embodiments may be combined with each other as required. For example, the control program 24a represented in the embodiments may be divided into a plurality of modules or may be integrated with any other program. In the embodiments, the fingers are used to operate the three-dimensional object; however, a stick-like object or so of which end can be charged with static electricity may be used instead of the fingers.

In the embodiments, the example of using the imaging units and the touch sensor are used as a detector in order to detect the three-dimensional object; however, the detector is not limited thereto. For example, a sensor using a Time-of-Flight (TOF) method may be used instead of the imaging unit. When a plurality of proximity sensor or the like capable of detecting a movement of the three-dimensional object in a planar direction of the three-dimensional space are arranged substantially horizontally with respect to a moving direction of the object, displacement of the object can be detected even in a noncontact manner, and therefore these devices may also be used. It is preferable that the displacement of the object can be detected without providing the sensor or the like in the object. If the sensor or the like is not provided in the object, then this does not have to attach an acceleration sensor to the finger or does not have to move a display device itself with an acceleration sensor, which leads to cost reduction.

The embodiments have explained the case where the three-dimensional object projects toward the user side; however, the present invention is also applicable to a case of representing the three-dimensional object as if it is present in a deeper side than the display unit. In this case, a sensor and a camera may be provided in the back side of the display unit. When the display device is a mobile phone, many mobile phones are provided with an in-camera for photographing the user himself/herself and an out-camera for photographing landscapes and the like. Therefore, it may be configured to capture the displacement of the object in the back side by using the out-camera.

The embodiments are configured that the display device singly detects an operation performed for the three-dimensional object; however, the display device may collaborate with a server to detect an operation performed for the three-dimensional object. In this case, the display device successively transmits information detected by the detector to the server, and the server detects the operation to notify the display device of the detection result. Such a configuration as above enables the load of the display device to be reduced.

The advantages are that one embodiment of the invention provides a display device that can provide the user with convenient operations.

What is claimed is:

1. A display device, comprising:
   a display unit for stereoscopically displaying a display object to appear as an object existing in a three-dimensional space;
   a detecting unit for detecting an actual object in the three-dimensional space; and
   a control unit for changing, when a movement of the actual object is detected in the three-dimensional space, a display form of the same display object according to the movement of the actual object and a type of the display object,
   wherein
   the control unit is configured to start changing the display object from when the movement of the actual object to an inside of the display object is detected, and
   the control unit is configured to display, when the movement of the actual object to the inside of the display object becomes undetectable before a predetermined time elapses and after the display object is started to change, a reverse change of the display object.

2. The display device according to claim 1, wherein the control unit is configured to display the reverse change in a shorter time than a time taken by the change.

3. The display device according to claim 1, wherein the control unit is configured to change the display object by moving or rotating the display object or by combining the movement and the rotation with a movement of the actual object.

4. The display device according to claim 1, wherein the control unit is configured to change the display object by deforming the display object with a movement of the actual object.

5. The display device according to claim 1, wherein the detecting unit includes an imaging unit for photographing an image of the actual object.

6. The display device according to claim 1, wherein the detecting unit includes a touch sensor for detecting a capacitance of the actual object.

7. The display device according to claim 1, wherein the detecting unit includes an imaging unit for photographing an image of the actual object and a touch sensor for detecting a capacitance of the actual object, and
the control unit is configured to use a weighted average of a detection result via the imaging unit and a detection result via the touch sensor to specify the location of the actual object.

8. The display device according to claim 1, wherein the type of the display object is any one selected from the group consisting of a rigid body, an elastic body, a plastic body, liquid, gas, and an aggregate.

9. The display device according to claim 1, wherein the control unit is configured to change the display object according to a speed of the actual object in the movement of the actual object.

10. The display device according to claim 1, wherein the display unit is further configured to display a bottom surface in the three-dimensional space, the bottom surface supporting the display object, and
the control unit is configured to change the display object while the display object is being supported by the bottom surface.

* * * * *